United States Patent
Gell et al.

(10) Patent No.: US 6,974,640 B2
(45) Date of Patent: Dec. 13, 2005

(54) DUPLEX COATINGS AND BULK MATERIALS, AND METHODS OF MANUFACTURE THEREOF

(75) Inventors: Maurice Gell, Newington, CT (US); Tongsan D. Xiao, Willington, CT (US); Leon Shaw, Willington, CT (US); Eric Jordan, Storrs, CT (US); Xiangliang Jiang, Changsha (CN)

(73) Assignee: The University of Connecticut, Storrs, CT (US)

( * ) Notice: Subject to any disclaimer, the term of this patent is extended or adjusted under 35 U.S.C. 154(b) by 44 days.

(21) Appl. No.: 10/191,977

(22) Filed: Jul. 9, 2002

(65) Prior Publication Data

US 2003/0108680 A1 Jun. 12, 2003

Related U.S. Application Data

(60) Provisional application No. 60/304,091, filed on Jul. 9, 2001.

(51) Int. Cl.[7] ................................. B32B 9/00
(52) U.S. Cl. .................... 428/701; 428/702; 428/304.4; 428/312.2
(58) Field of Search ............................... 428/697, 698, 428/699, 701, 702, 686, 688, 304.4, 312.2

(56) References Cited

U.S. PATENT DOCUMENTS 6,723,387 B1 * 4/2004 Kear et al. .................. 427/450

OTHER PUBLICATIONS

Bhat, H. and Herman, H. "Plasma–Spray–Quenched Martensitic Stainless Steel Coatings." Thin Solid Films. 1982. vol. 95,pp. 227–235.

Gell, Maurice. "Application Opportunities for Nanostructured Materials and Coatings." Materials Science and Engineering. 1995. vol. A204, pp. 246–251.

Gleiter, H. "Materials with Ultrafine Microstructures: Retrospectives and Perspectives." Nanostructured Materials. 1992. vol. 1, pp. 1–19.

Goberman, D. et al. "Microstructure Development of Al2O3–13wt.%TiO2 Plasma Sprayed Coatings Derived from Nanocrystalline Powders." Acta Materialia. 2002. vol. 50, pp. 1141–1152.

Hahn, H. "Microstructure and Properties of Nanostructured Oxides." Nanostructured Materials. 1993. vol. 2, pp. 251–265.

(Continued)

Primary Examiner—Jennifer McNeil
(74) Attorney, Agent, or Firm—Cantor Colburn LLP

(57) ABSTRACT

A contiguous duplex microstructured material comprises a nanostructured material having two structural states, for example, a duplex microstructured coating. One state comprises substantially nanostructured features, while the second state substantially comprises microstructured features. A duplex nanostructured coating can be made by thermal spraying a reconstituted nanostructured material onto a substrate under conditions effective to form a coating comprising more than one structural state.

17 Claims, 21 Drawing Sheets

(a)

(b)

OTHER PUBLICATIONS

Jia, K. and Fischer, T.E. "Abrasion Resistance of Nanostructured and Conventional Cemented Carbides." Wear. 1996. vol. 200, pp. 206–214.

Jia, K. and Fischer, T.E. "Sliding Wear of Conventional and Nanostructured Cemented Carbides." Wear. 1997. vol. 203–204, pp. 310–318.

Jordan, E.H. et al. "Fabrication and Evaluation of Plasma Sprayed Nanostructured Alumina–titania Coatings with Superior Properties." Materials Science and Engineering. 2001. vol. A301, pp. 80–89.

McPherson, R. "Formation of Metastable Phases in Flame- and Plasma–prepared Alumina." Journal of Material Science. 1973. vol. 8, pp. 851–858.

McPherson, R. "On the Formation of Thermally Sprayed Alumina Coatings." Journal of Material Science. 1980. vol 15, pp. 3141–3149.

McPherson, R. "Relationship Between the Mechanism of Formation, Microstructure and Properties of Plasma–sprayed Coatings." Thin Solid Films. 1981. vol. 83, pp. 297–310.

McPherson, R. "On the Formation of Thermally Sprayed Alumina Coatings." Journal of Material Science. 1980. vol 15, pp. 3141–3149.

Mishra, R.S. et al. "Nanocrystalline Alumina by High Pressure Sintering." Materials Science Forum. 1996. vols. 225–227, pp. 617–622.

Moreau, C. et al. "Temperature Evolution of Plasma–sprayed Niobium Particles Impacting on a Substrate." Surface and Coatings Technology. 1991. vol. 46, pp. 173–187.

Pawlowski, Lech. "Microstructural Study of Plasma–sprayed Alumina and Nickel Chromium Coatings." Surface and Coatings Technology. Auust, 1987. vol. 31, Issue 2, pp. 103–116. Abstract.

Pawlowski, Lech et al. "A Model of the Temperature Distribution in an Alumina Coating During Plasma Spraying." Thin Solid Films. 1982. vol. 94, pp. 307–319.

Shaw, Leon L. et al. "Measurement of the Interfacial Fracture Energy of Thermal Barrier Coatings." Scripta Materialla. 1998. vol. 39, No. 10, pp. 1427–1434.

Shaw, Leon L. et al. "The Dependency of Microstructure and Properties of Nanostructured Coatings on Plasma Spray Conditions." Surface and Coatings Technology. 2000. vol. 130. pp. 1–8.

Seigel, Richard W. "Mechanical Properties of Nanophase Materials." Materials Science Forum. 1997. vols. 235–238, pp. 851–860.

Wang, You et al. "Abrasive Wear Characteristics of Plasma Sprayed Nanostructured Alumina–titania Coatings." Wear. 2000. vol. 237, pp. 176–185.

Wilms, Volker, and Shaw, Herbert. "Plasma Spraying of Al2O3 and Al2O3–Y2O3." Thin Solid Films. 1976. vol. 39, pp. 251–262.

* cited by examiner (a)

(b)

(c)

(a) (b)

DUPLEX COATINGS AND BULK MATERIALS, AND METHODS OF MANUFACTURE THEREOF

CROSS-REFERENCE TO RELATED APPLICATION

This application claims priority to U.S. application No. 60/304,091, filed Jul. 9, 2001, which is incorporated herein by reference in its entirety.

STATEMENT OF FEDERAL SPONSORSHIP

The government may have rights to this application under Office of Naval Research Grant No. N00014-98-C-0010.

BACKGROUND

This disclosure relates to nanostructured materials, and in particular to nanostructured coatings and bulk materials, as well as methods for the manufacture thereof.

Nanostructured materials are those materials having average grain sizes smaller than about 100 nanometers. Such materials can have improved properties compared to those with larger grain sizes including improved abrasion resistance and wear resistance. For example, bulk tungsten carbide (WC/Co) materials with grain sizes in the nanometer range possess an abrasion resistance approximately double that of the most abrasion resistant conventional, i.e., microstructured, WC/Co material. The improved abrasion resistance has been attributed to the high hardness of the nanostructured material and their ultrafine grain sizes. The ultrafine grain size is thought to alter the fracture and material removal mechanisms. Nanostructured WC/Co bulk materials also exhibit better sliding wear resistance than their conventional counterparts. It has also been shown recently that nanostructured titanium dioxide ($TiO_2$) bulk materials have wear resistance that is two to three times better than that exhibited by their conventional titanium dioxide counterparts.

Thermal spray techniques have been used to deposit thick, non-nanostructured oxide coatings, and there has been extensive experimental examination of the relationship between processing conditions and the phase constituents, structures and mechanical properties of such non-nanostructured coatings. Thermal spray techniques include air-plasma, electric arc, flame spray and fuse, high velocity oxy-fuel, and detonation-gun spraying. However, relatively little is known of the relationship between processing techniques and the phase constituents, structures and mechanical properties of nanostructured coatings produced thereby. In view of the increasing importance of nanostructured materials, there remains a need for new nanostructured materials, as well as economical methods for the manufacture of such materials.

SUMMARY

A novel material having a duplex microstructure comprises a state having nanostructured features contiguous to a state having microstructured features. The composition of the materials in each state may be the same or different. The novel material has improved properties compared to conventional materials of the same overall composition, in particular toughness, machinability, adhesiveness, and wear and crack resistance. They are accordingly of particular utility in coatings, particularly protective coatings, and in bulk applications.

A method for the formation of a duplex microstructured material comprises heating a nanostructured material under conditions effective to produce a fully melted phase and a partially melted phase, which upon solidification produces material having a duplex microstructure. One preferred method for the formation of a duplex microstructure material comprises thermal spray of a nanostructured material under conditions effective to produce a fully melted phase and a partially melted phase. Modification of the conditions, in particular the (voltage)(current)/primary gas flow rate during plasma spray, allows adjustment of the properties of the duplex microstructured materials.

BRIEF DESCRIPTION OF THE DRAWINGS

Referring now to the FIGURES, which are meant to be exemplary and not limiting.

DETAILED DESCRIPTION OF THE PREFERRED EMBODIMENTS

Novel duplex microstructured materials as described herein have improved properties relative to the same materials having a conventional microstructure. Such duplex microstructured materials are materials comprising at least two contiguous microstructural states. The first state is a material having substantially nanostructured features (e.g., grain sizes, precipitates, dispersoids and the like). Nanostructured features are features of a size less than or equal to about 100 nanometers (nm). A state having substantially nanostructured features is a state wherein greater than or equal to about 90%, preferably greater than or equal to about 95% of the volume of the state comprises nanostructured features.

Figure 15:
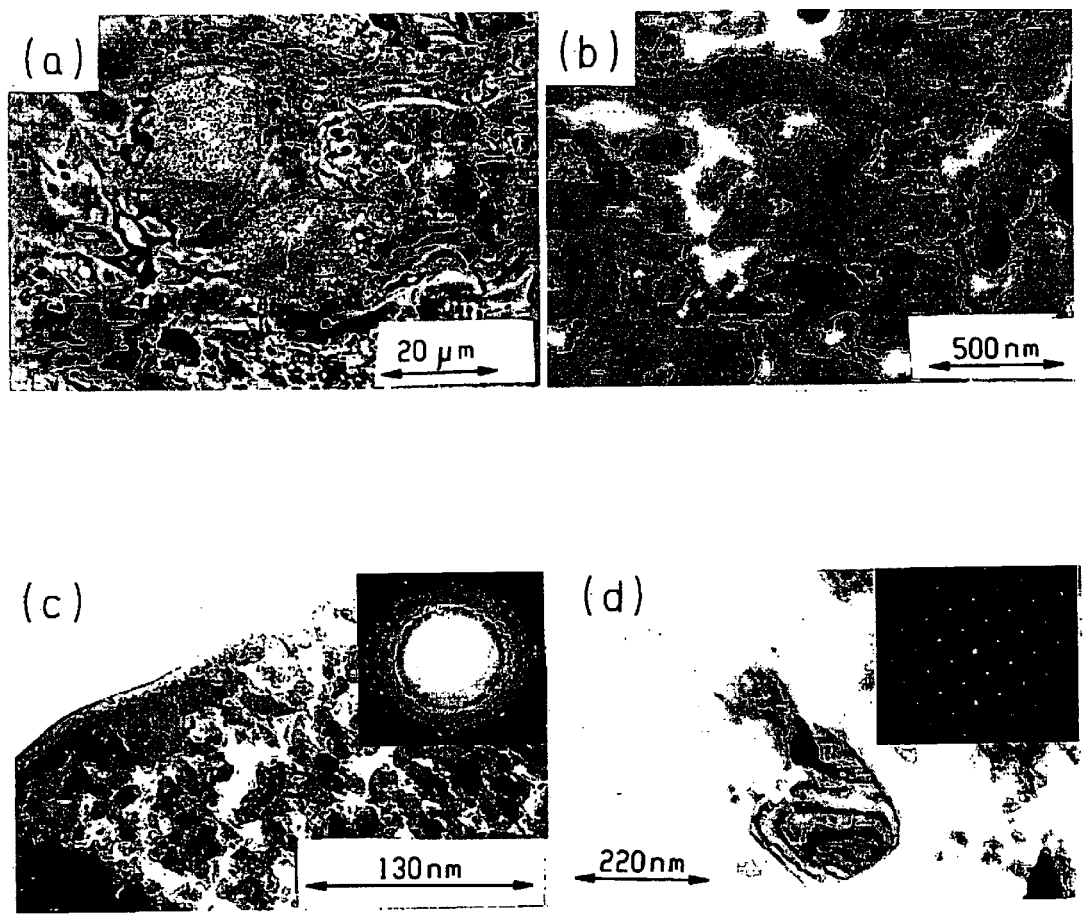
FIG. 15 shows electron micrographs from plasma sprayed nanostructured $Al_2O_3$-13 wt % $TiO_2$ coatings. (a) The coating consists of two regions identifies by "F", fully-melted and splat-quenched $\gamma$-$Al_2O_3$ region and "P" partially melted region where the microstructure of the starting agglomerates is retained. (b) The partially-melted region "P" consists of α-$Al_2O_3$ (black) embedded in γ-$Al_2O_3$ (white). The transmission electron micrographs from "P" shows the (c) small γ-$Al_2O_3$ grains and (d) relatively larger γ-$Al_2O_3$ grains.

The second state of the material has substantially microstructured features, which are features of a size greater than about 100 nm. Such features may also be less than or equal to about 100 micrometers. A state having substantially microstructured features is a state wherein greater than or equal to about 10%, preferably greater than or equal to about 40%, and more preferably greater than or equal to about 75% of the volume of the state comprises microstructured features. Nanostructured and microstructured states and the features therein are readily observable by techniques known in the art, for example, electron microscopy. As shown in FIG. 15, for example, the at least two states in the duplex microstructured materials are contiguous over at least a substantial portion of the interface between the two states. Additional states or phases may also be present in the duplex materials, as long as both nanostructured and microstructured states are present.

Useful materials for the formation of duplex microstructured materials include those metal and ceramic materials capable of existing in a nanostructured state. Suitable metals include, for example, aluminum, boron, sodium, potassium, lithium, calcium, barium, and magnesium, and the transition metals such as chromium, iron, nickel, niobium, titanium, zirconium, scandium, yttrium, lanthanum, cerium, praseodymium, neodymium, samarium, terbium, and ytterbium. Suitable ceramics include, for example, metal oxides, carbides, nitrides, or suicides of metals such as aluminum, boron, sodium, potassium, lithium, calcium, barium, and magnesium, and the transition metals such as chromium, iron, nickel, niobium, titanium, zirconium, scandium, yttrium, lanthanum, cerium, praseodymium, neodymium, samarium, terbium, ytterbium, and combinations comprising at least one of the foregoing materials. Oxides are preferred. Stabilized or partially stabilized ceramics such as those stabilized by the presence of a rare earth-based compound may be used. Stabilized ceramics include, for example, zirconium oxide stabilized with yttrium oxide (YSZ) or zirconia stabilized by ceria, scandia, calcia, magnesia or other oxides.

Particularly useful nanostructured materials are those metal and ceramic materials capable of existing in a nanostructured state and in more than one solid phase, such materials including, but not being limited to, aluminum oxide, and titanium oxide. Preferred materials include titanium dioxide ($TiO_2$), aluminum oxide ($Al_2O_3$), and mixtures comprising at least one of the foregoing oxides.

The nanostructured material may also include one or more grain growth inhibitors (also known as nucleating agents). Examples of grain growth inhibitors include, for example, $CeO_2$ and $ZrO_2$.

The nanostructured materials may be combined with a compatible, non-nanostructured material that may or may not exist in more than one phase. Exemplary non-nanostructured materials include metals and ceramics. Suitable metals include, for example, aluminum, boron, sodium, potassium, lithium, calcium, barium, and magnesium, and the transition metals such as chromium, iron, nickel, niobium, titanium, zirconium, scandium, yttrium, lanthanum, cerium, praseodymium, neodymium, samarium, terbium, and ytterbium. Suitable ceramics include metal oxides, carbides, nitrides, or silicides of, for example, aluminum, boron, sodium, potassium, lithium, calcium, barium, and magnesium, and the transition metals such as chromium, iron, nickel, niobium, titanium, zirconium, scandium, yttrium, lanthanum, cerium, praseodymium, neodymium, samarium, terbium, ytterbium, and combinations comprising at least one of the foregoing materials.

It has been discovered that contiguous duplex microstructured materials may be conveniently prepared by thermal treatment of a nanostructured material, preferably a reconstituted nanostructured material as described below. Effective thermal treatment converts the nanostructured material into at least two states, one comprising substantially nanostructured features and the second comprising substantially microstructured features. Thermal treatment may be accomplished by a number of different methods, depending on the particular material or materials used. While reconstituted nanostructured materials are preferred starting materials, other starting materials for production of a duplex microstructured material are also within the scope of this disclosure.

In the simplest embodiment, a particulate nanostructured material is thermally treated by thermal spray (for example, plasma spray, dc-arc spray, laser thermal spray, electron beam spray), chemical vapor deposition, physical vapor deposition, or similar methods, so as to fully melt one portion of the particle, i.e., the outer surface, but only partially melt another portion of the particle, i.e., the core, so as to provide a duplex microstructure upon solidification.

In another method, a nanostructured material comprising a first, lower melt temperature composition, and a second, higher melt temperature composition may be employed. The first and second compositions may be in the form of intimately mixed particles, for example, or the first composition may be in the form of a coating on particles of the second composition. Thermal processing at a temperature above the first, lower melting temperature but below the second, higher melting temperature allows formation of a duplex microstructure. In one embodiment, thermal treatment results in the first, lower melting composition being fully melted, thereby resulting in a nanostructured state upon solidification, and the second, higher melting composition being partially melted, resulting in a substantially microstructured state upon solidification. Alternatively, thermal processing at a higher temperature may be used to fully melt the first composition and partially melt the second composition, thereby forming a substantially microstructured phase in the first composition, and a nanostructured state in the second composition. Adjustment of the thermal processing temperature allows adjustments in the degree of melting of the first and second compositions, thereby allowing adjustment of the relative amounts of each state, and the particular features formed in the duplex microstructure upon solidification. Of course, more than two compositions may also be present. It is also known for one of the compositions to make contributions to more than one of the states in the duplex microstructure. For example, as described below, in thermal spray of a nanostructured mixture of alumina and titania, alumina forms part of both the nanostructured state and substantially microstructured state upon solidification.

In another method, a material comprising a nanostructured composition having a first particle size and a nanostructured material having a second particle size are thermally processed so as to fully melt the smaller particles, but not the larger particles, thereby providing a duplex microstructured material. The composition of the smaller and larger particles may be the same or different. In one embodiment, thermal treatment results in the smaller particles being fully melted, thereby resulting in a nanostructured state upon solidification, and the larger particles being partially melted, resulting in a substantially microstructured state upon solidification. Alternatively, thermal processing may result in the smaller particles forming a substantially microstructured phase, and the larger particles resulting in a nanostructured state. Adjustment of the thermal processing temperature allows adjustments in the degree of melting of the particles, thereby allowing adjustment of the relative amounts of each state, and the particular features formed in the duplex microstructure upon solidification. More than two sizes may also be present. It is also known that one of the particle sizes to make contributions to more than one of the states in the duplex microstructure. For example, as described below, in thermal spray of a nanostructured mixture of smaller particles of alumina and larger particles of titania, alumina forms part of both the nanostructured state and substantially microstructured state upon solidification.

In one manner of proceeding, a preferred method of making a duplex microstructured material comprises preparing a slurry of a nanostructured material; spray drying the slurry to form agglomerates of the nanostructured material suitable for thermal spray of the agglomerates; and thermal or plasma spraying the agglomerates onto a substrate to form a contiguous duplex microstructured material. During thermal spraying, the processing conditions are adjusted so as to result in a nanostructured material with a duplex microstructure. In particular, if plasma spraying is used, the critical plasma spray parameter (CPSP), which is defined as (voltage)(current)/primary gas flow rate, is adjusted so as to result in a material having at least a nanostructured state and a larger scale state.

A slurry of the nanostructured material may be prepared by means known in the art. While it is contemplated that a small amount of the nanostructured material (i.e., less than about 25% weight percent of the total material) may contain microstructured features, better results are obtained when fully nanostructured starting materials are used. Preferably the nanostructured material is ultrasonically disintegrated and dispersed in a liquid medium. The liquid medium may be aqueous or organic, depending on the desired characteristics of the final agglomerated powder. Suitable organic solvents include, but are not limited to, toluene, kerosene, methanol, ethanol, isopropyl alcohol, acetone, and the like.

A binder may also be added to the slurry. In organic liquid mediums, the optional binder may comprise about 0% wt % to about 15 wt %, preferably about 5 wt % to about 10 wt % based on the total weight of the slurry. Suitable binders include, for example, paraffin dissolved in a suitable organic solvent such as, for example, hexane, pentane, toluene, and the like. In aqueous liquid mediums, the binder may comprise an emulsion of commercially available polyvinyl alcohol (PVA), polyvinylpyrrolidone (PVP), carboxymethyl cellulose (CMC), or other water-soluble polymers, preferably suspended in de-ionized water. The binder may comprise about 0.5% to about 5% by weight of the total aqueous slurry.

After formation of the slurry comprising a nanostructured material, the slurry is spray-dried in hot air to form agglomerated particles. While many suitable non-reactive gas or mixtures thereof may be used, nitrogen or argon is preferred. Preferred temperatures for spray drying the slurry are, for example, 150° C. to about 350° C., preferably about 150° C. to about 250° C. Because there is no requirement for the treatment of exhaust gases from the spray drier using aqueous-based liquid mediums, aqueous-based liquid mediums are preferred where possible. The size of the agglomerates is adjusted to facilitate thermal spraying, and are micrometer sized agglomerates generally of about 0.5 micrometers to about 100 micrometers, preferably about 20 micrometers to about 80 micrometers, more preferably, about 40 micrometers to about 70 micrometers.

After spraying, the agglomerates may optionally be heat-treated at low temperatures (e.g., less than about 250° C.) to expel residual moisture, leaving the organic component (e.g., polymer or paraffin) as a binder phase. The agglomerates are then optionally subjected to a high temperature heat treatment to remove the binder, typically at a temperature of about 800° C. to about 1200° C. The resulting agglomerates form a reconstituted sprayable nanostructured powder that is particularly useful for the formation of materials with duplex microstructures such as, for example, coatings. The resulting reconstituted sprayable nanostructured powder may then be used in thermal, plasma, or other spray deposition processes. Surprisingly, it has been found that thermal spraying and subsequent deposition of the reconstituted sprayable nanostructured powder results in formation of a duplex microstructure. Thermal spraying is defined as spraying under conditions sufficient to produce a duplex microstructure. In the plasma spray treatment of the above-described reconstituted sprayable nanostructured powders, for example, a duplex microstructure is formed. The two distinctive microstructures can be described as a fully-melted (FM) region and a partially-melted (PM) region. The FM region corresponds to a state having substantially nanostructured features wherein greater than or equal to about 90%, preferably greater than or equal to about 95% of the volume of the region comprises nanostructured features. The PM region corresponds to state having substantially microstructured features wherein greater than or equal to about 10%, preferably greater than or equal to about 40%, and more preferably greater than or equal to about 75% of the volume of the region comprises microstructured features. A preferred method of thermal treatment is thermal spraying to form a coating, although other methods of thermal treatment are within the scope of this disclosure. A particularly useful method of thermal spraying is plasma spraying.

In particular, it has been discovered that by adjustment of the critical plasma spray parameter (CPSP), the phase composition of the duplex microstructure can be varied. Thermal spray conditions are thus selected using the CPSP. The CPSP is defined as:

$$CPSP = \frac{Voltage \cdot Current}{Primary\ Gas\ (Ar)\ Flow\ Rate}$$

Under controlled processing conditions, the CPSP can be directly related to the temperature of the plasma and/or the particles. A decrease in the CPSP, for example, results in an increase in the percentage of the coating that is partially melted. An increase in the CPSP, in contrast, results in a decrease in the percentage of the coating that is partially melted, thus resulting in a coating that is more fully melted.

It has been found that a conventional powder of the same composition as the reconstituted, sprayable nanostructured powder forms only FM regions upon plasma spraying. Thus, conventional materials form only a single state material rather than a duplex microstructure. Without being held to theory, it is believed that heating of the reconstituted sprayable nanostructured powder to temperatures of greater than or equal to about 10,000° K. in a plasma spray torch results in melting of the larger reconstituted particles while leaving the nanostructured core solid. The melted surface regions likely comprise the observed fully-melted regions, while the unmelted core regions likely comprise the partially melted regions. It is the presence of both the fully-melted regions ("splats") comprising smaller (i.e., nanostructured features) and partially-melted regions comprising larger (i.e., microstructured features) that form the contiguous duplex microstructure.

The duplex microstructure as described herein has improved physical and mechanical properties over single-state structures. For example, duplex microstructured coatings have improved crack growth resistance and as compared to single phase coatings. While single phase coatings have an indentation crack resistance of about 4000 mm$^{-3}$ the duplex microstructure coatings can have an indentation crack resistance of as high as about 13000 mm$^{-3}$. In addition, it should be noted that the highest crack growth resistance of the duplex microstructure coatings is achieved at intermediate values of CPSP.

Duplex microstructured coatings further show an improved pass rate in both bend and cup tests. Significant spallation is observed with single phase materials while partial failure and pass are observed for the duplex microstructure coatings. In particular, the duplex microstructure coatings exhibited minimum spallation without cracking as compared to single phase coatings.

The wear resistance of the duplex microstructure coatings can have a 100% to 200% improvement in abrasive wear resistance as compared to single phase materials. Further, the duplex microstructured coatings exhibit improved performance in scratch tests as compared to single phase coatings.

A particularly advantageous improvement is observed in the adhesive strength of the duplex microstructure coatings, in that bond strength to the substrate is improved as much as about 2-fold compared to comparable single phase coatings. Without being held to theory, this improvement may arise from use of agglomerates in the form of hollow spheres. Where the sphere is hollow, the duplex microstructure produced upon thermal spraying can have more a uniform residual stress because the hollow structure of the agglomerates allows for deposition at lower temperatures than solid agglomerates. Less residual stress is accordingly produced in the material upon cool down.

The duplex microstructured materials can be in the form of coatings. Coatings are advantageously formed by thermal treatment such as thermal spraying, particularly plasma spraying. Preferred coating thicknesses are 200 to 800 micrometers, preferably 250 to 600 micrometers.

In addition to coatings, the duplex microstructured materials can be provided in the form of bulk materials. Bulk materials may be obtained, for example, by radiofrequency (RF) plasma spray, which can be used to make structural preforms with thicknesses greater than about 1000 micrometers. Such pre-forms can provide structural components with improved properties relative to the conventional single-state materials.

Alternatively, at least two starting nanostructured materials of different melting points can be hot pressed and then sintered at a temperature between the melting temperatures of the two materials to produce a bulk duplex microstructured material. In yet another example, a starting mixture of a fine and a coarse-grained material having the same composition can be sintered to form a bulk duplex microstructured material. It is also possible to produce a bulk material by consolidation of nanostructured powders (e.g., by cold-pressing), followed by sintering to provide duplex microstructure. Such methods may be sued to provide articles such as aircraft parts and the like with improved properties. Alternatively, In another example, The invention is further illustrated by the following non-limiting Examples.

EXAMPLES

Example 1

Formation of Reconstituted Agglomerates

Nanostructured Al$_2$O$_3$ and TiO$_2$ powders used had a mean particle diameter of 50 and 70 nm, respectively, and were obtained from Nanophase Technologies Corporation, Burr Ridge, Ill. These powders were mixed to produce a powder mixture having a composition equivalent to commercially obtained Metco-130 (i.e., 87 wt % $Al_2O_3$ and 13 wt % $TiO_2$).

Figure 3:
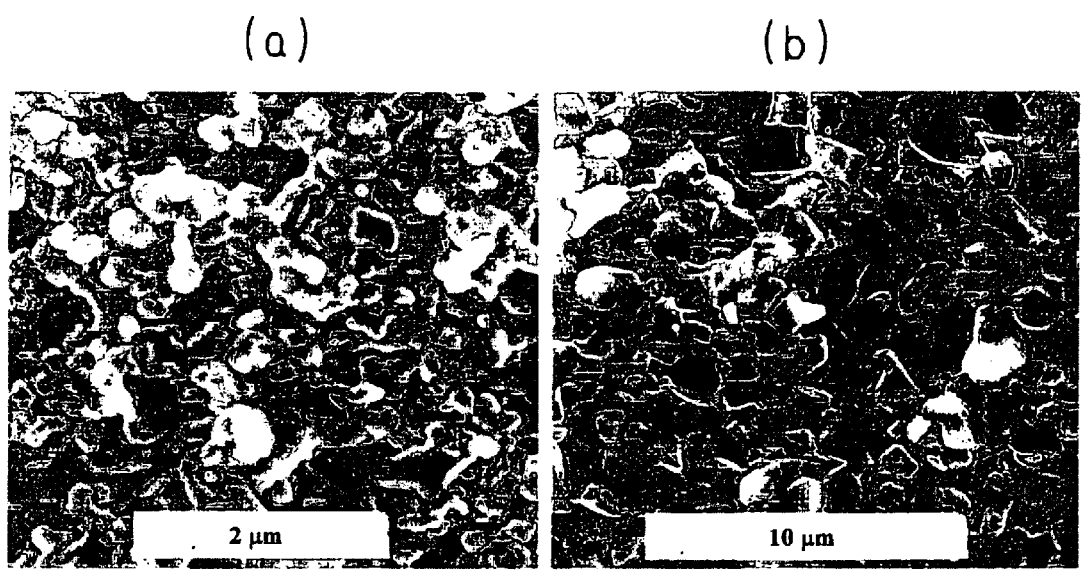
FIG. 3 shows SEM images of the fracture surface of $Al_2O_3$-13 wt % $TiO_2$ samples sintered at (a) 1300° C. and (b) 1400° C.

The slurry prepared from this powder mixture were spray dried to form micrometer-sized agglomerates (20–100 micrometers). The agglomerates were subsequently subjected to a heat treatment to burn out the binder used in the spray drying and to provide some strength for handling and for the thermal spray process. Various heat treatment temperatures (800–1200° C.) were investigated in order to identify the optimal temperature for this purpose. Table 1 summarizes the phase evolution of $Al_2O_3$ and $TiO_2$ during heat treatment. It can be seen that gamma-$Al_2O_3$ changes to delta- and finally to alpha-phase as the heat treating temperature increases. For $TiO_2$, anatase polymorph changes to rutile as temperature increases. At 1000° C., all $Al_2O_3$ has changed to α-structure and $TiO_2$ to rutile polymorph.

consistent with that determined from spray dried granules, i.e., above 1000° C. all $Al_2O_3$ has α-structure and all $TiO_2$ becomes rutile. Grain growth was again found to have occurred at or below 1000° C., consistent with the study of spray dried granules. However, substantial sintering and grain growth occur between 1050 and 1300° C. Furthermore, microhardness increases sharply at 1350° C. as the density of the sintered body becomes higher than 90%. This relative density the microhardness of the sintered body (HV=1341 $kg/mm^2$) is already far above the microhardness value of conventional Metco-130 coatings (HV=about 1000 $kg/mm^2$). Aluminum titanate ($Al_2TiO_5$) does not form until 1400° C. is reached. The grain size in Table 2 was estimated using XRD when it was smaller than 100 nm and using fracture surface when it was larger than 100 nm. Two typical fracture surfaces of sintered bodies are presented in FIG. 3, showing grain size and porosity.

TABLE 2

Sintering Results of Compacted Nano-Oxide Bodies

| Temp. | Heating rate | Holding time (h) | Relative density (%) | Vickers Hardness ($kg/mm^2$) | Average grain size (nm) | Phases (XRD) |
|---|---|---|---|---|---|---|
| RT | — | — | 61.0 | — | 50–70 | γ-$Al_2O_3$, Anatase-$TiO_2$ |
| 1000° C. | 600° C./h | 2 | 65.2 | 140 | 100–150 | α-$Al_2O_3$, Rutile-$TiO_2$ |
| 1050° C. | 600° C./h | 2 | 66.4 | 174 | 150 | α-$Al_2O_3$, Rutile-$TiO_2$ |
| 1300° C. | 500° C./h | 1 | 78.8 | 673 | 300 | α-$Al_2O_3$, Rutile-$TiO_2$ |
| 1350° C. | 500° C./h | 1 | 91.9 | 1341 | 500 | α-$Al_2O_3$, Rutile-$TiO_2$ |
| 1400° C. | 500° C./h | 1 | 94.5 | 1715 | 2,000 | α-$Al_2O_3$, $Al_2TiO_5$ |

TABLE 1

Evolution of Phases in $Al_2O_3$/$TiO_2$ during Heat Treatment

| Heat Treatment Conditions | $Al_2O_3$ | $TiO_2$ |
|---|---|---|
| Before heat treatment | γ-$Al_2O_3$ | Anatase |
| 800° C. for 2 hr | Mostly γ-$Al_2O_3$, some δ-$Al_2O_3$ | Mostly Anatase, some Rutile |
| 900° C. for 2 hr | Mostly δ-$Al_2O_3$, some γ-$Al_2O_3$ and α-$Al_2O_3$ | Mostly Rutile, some Anatase |
| 1000° C. for 2 hr | 100% α-$Al_2O_3$ | 100% Rutile |

Figure 1:
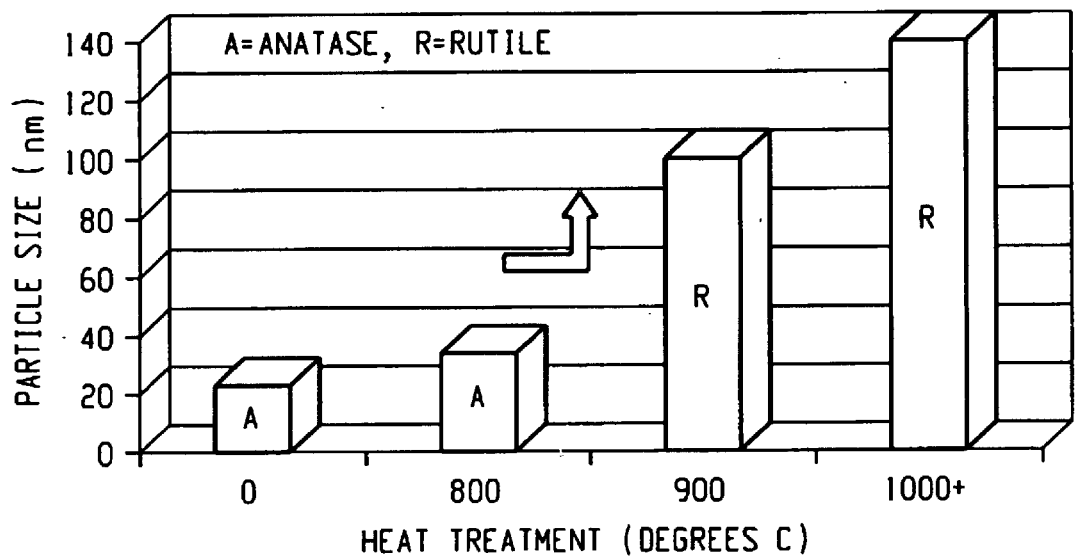
FIG. 1 shows the grain size of $TiO_2$ after heat treating for 2 hours at different temperatures. The grain size is determined with X-ray diffraction.
Figure 2:
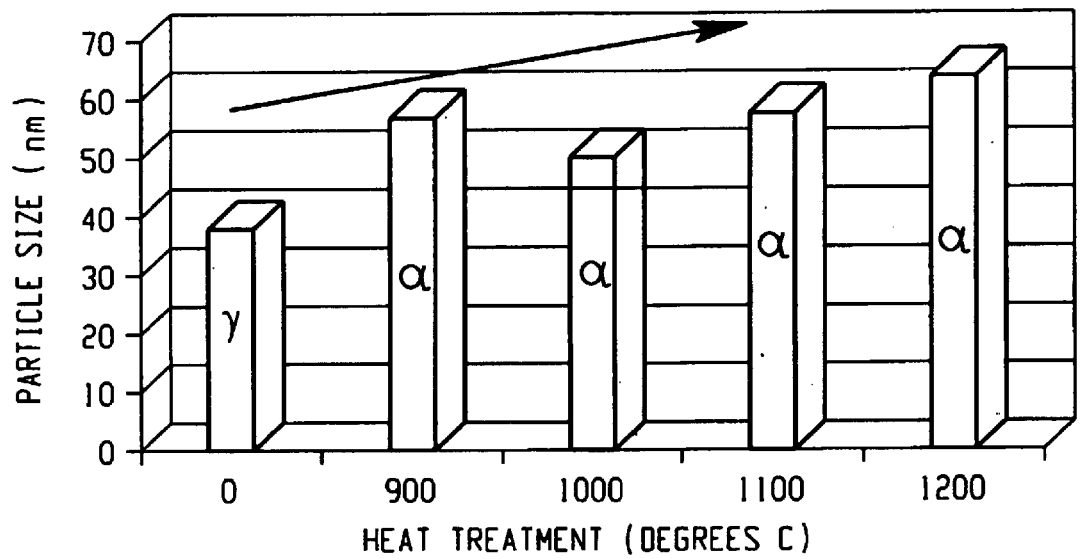
FIG. 2 shows the grain size of $Al_2O_3$ after heat treating for 2 hours at different temperatures. The grain size is determined with X-ray diffraction.

Accompanying the phase transformation, grain sizes of $Al_2O_3$ and $TiO_2$ also increase with temperature. As shown in FIG. 1, the grain size of $TiO_2$ increases sharply at 900° C. and becomes larger than 100 nm above this temperature. In contrast, grain growth of $Al_2O_3$ is relatively slow in comparison with $TiO_2$. With the 1200° C. heat treatment (FIG. 2), the grain size of $Al_2O_3$ remains below 100 nm. These results indicate that a heat treatment temperature of 1200° C. or below should be used if the grain size of $Al_2O_3$ below 100 nm is desired in the coating.

Example 2

Sintering Behavior of Nanostructured $Al_2O_3$-13 wt % $TiO_2$

The phase transformation and sintering behavior of compacted, nanostructured $Al_2O_3$ and $TiO_2$ green bodies were also investigated. The density, grain size, phase content and microhardness of the sintered bodies are summarized in Table 2. It can be seen that the phase content measured is This data shows that phase transformation of nanosized $Al_2O_3$ and $TiO_2$ during heat treating and sintering is, in general, consistent with the thermodynamic predication. Many works have shown that anatase $TiO_2$ transforms to rutile irreversibly at temperatures higher than 610° C. The present study is consistent with these reports, i.e. some anatase $TiO_2$ has transformed to rutile at 800° C. and the transformation does not complete until 1000° C. For $Al_2O_3$, it has been established that on heating boehmite (AlOOH) the following phase transformation takes place:

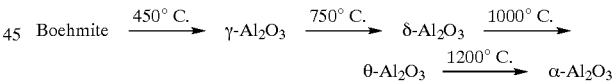

$$\text{Boehmite} \xrightarrow{450°\text{ C.}} \gamma\text{-}Al_2O_3 \xrightarrow{750°\text{ C.}} \delta\text{-}Al_2O_3 \xrightarrow{1000°\text{ C.}} \theta\text{-}Al_2O_3 \xrightarrow{1200°\text{ C.}} \alpha\text{-}Al_2O_3$$

The present study shows that γ-$Al_2O_3$ starts to transform to δ-$Al_2O_3$ at about 800° C. and then transform to α-$Al_2O_3$ starting at about 900° C. At 1000° C. all $Al_2O_3$ has transformed to α-structure. Reasons for the absence of θ-$Al_2O_3$ and the lower temperature for the formation of α-$Al_2O_3$ are not clear. It may be related to the presence of $TiO_2$ or trace elements present in $Al_2O_3$. Nevertheless, the general trend of the phase transformation of nanostructured $Al_2O_3$ follows the established sequence of micrometer-sized counterparts. Thus, it is expected that the phase transformation behavior of nanostructured $Al_2O_3$ and $TiO_2$ during thermal spray should be similar to that of conventional coarse-grained counterparts.

Example 3

Phase Transformation of Nanostructured Particles During Thermal Spraying

Thermal spraying of the reconstituted granules was carried out with a Metco 9 MB plasma gun and GH nozzle was used. The oxide coating was deposited up to 250 to 600 micrometers thick on mild carbon steel coupons. The spray parameters investigated were the electrical current, voltage, working gas flow rate, spray distance, powder carrier gas flow rate, powder feed rate, and gun moving speed. The ranges of the spray parameters that were studied are summarized in Table 3. For comparison, thermal spraying of commercial Metco-130 powder was also carried out.

TABLE 3

Summary of Plasma Spray Parameters

| Parameters | Current (amp) | Voltage (volts) | Primary Ar gas pressure (psi) | Secondary $H_2$ gas pressure (psi) | Primary Ar gas flow rate (SCFH) | Powder carrier gas flow rate (SCFH) | Powder feed rate (lb/hr) | Gun moving speed (mm/s) | Spray distance (inch) |
|---|---|---|---|---|---|---|---|---|---|
| Range | 400–650 | 60–75 | 100 | 55 | 120–200 | 40–80 | 0.2–6.0 | 500 | 3.5–4.5 |

Phase transformation and sintering behavior of compacted, nanostructured $Al_2O_3$ and $TiO_2$ green bodies were investigated. In this case, nanosized $Al_2O_3$ and $TiO_2$ powders were wet-mixed to produce a nominal composition of Metco-130. The wet-mixed powder was dried and then cold pressed using a cold isostatic press with a pressure of 270 MPa. The green density of the pellets so prepared was 61 percent of the theoretical. The cold pressed samples were subsequently heated in air to a desired sintering temperature and held for 1 or 2 hours.

The phase content of the coating produced from nano-structured powder was dependent on various thermal spray parameters. It was found that among the various parameters investigated, the CPSP had the most influential effect on the phase content of the coatings. Table 4 summarizes how the phase content of the coatings along with other coatings' characteristics varies with the CPSP ratio.

TABLE 4

Characteristics of the Coating as a Function of the CPSP

| CPSP (amp.volts/ SCFH) | Starting Phases of Powders (XRD) | Final Phases in the Coating* (XRD) | Relative Density of the Coating | Vickers Hardness $HV_{300}$ (Kg/mm$^2$) |
|---|---|---|---|---|
| ≦240 | $\gamma$-$Al_2O_3$ | some $\gamma$-$Al_2O_3$, more $\alpha$-$Al_2O_3$ | 85–88% | 450–600 |
| ≦240 | $\alpha$-$Al_2O_3$ | few $\gamma$-$Al_2O_3$, mostly $\alpha$-$Al_2O_3$ | 85–88% | 450–600 |
| 250–300 | $\alpha$-$Al_2O_3$ | more $\gamma$-$Al_2O_3$, some $\alpha$-$Al_2O_3$ | 88–90% | 650–850 |
| ≧310 | $\gamma$-$Al_2O_3$ | mostly $\gamma$-$Al_2O_3$, few $\alpha$-$Al_2O_3$ | 90–93% | 850–1100 |
| ≧310 | $\alpha$-$Al_2O_3$ | mostly $\gamma$-$Al_2O_3$, few $\alpha$-$Al_2O_3$ | 90–93% | 850–1100 |

*No or little x-ray reflection from $TiO_2$ and $Al_2TiO_5$ was observed. Thus, only $Al_2O_3$ polymorphs are reported.

It is well known that the two most critical parameters for thermal spray are the particle temperature and velocity. The effect of the CPSP observed (Table 4) is believed to be predominately related to the particle temperature that can be obtained at each specific CPSP. As summarized in Table 4, when the CPSP was equal to or less than 240, two types of phase transformations could occur, depending on the starting phase content:

$\gamma$-$Al_2O_3$ (starting phase)→some $\gamma$-$Al_2O_3$, more $\alpha$-$Al_2O_3$ (end phases)

$\alpha$-$Al_2O_3$ (starting phase)→few $\gamma$-$Al_2O_3$, mostly $\alpha$-$Al_2O_3$ (end phases)

When the CPSP≧310, two other types of phase transformations could occur:

$\gamma$-$Al_2O_3$ (starting phase)→mostly $\gamma$-$Al_2O_3$, few $\alpha$-$Al_2O_3$ (end phases)

$\alpha$-$Al_2O_3$ (starting phase)→mostly $\gamma$-$Al_2O_3$, few $\alpha$-$Al_2O_3$ (end phases)

When the CPSP was between 250 and 300, the phase transformation became:

$\alpha$-$Al_2O_3$ (starting phase)→more $\gamma$-$Al_2O_3$, some $\alpha$-$Al_2O_3$ (end phases)

These observed phase changes with the CPSP can be rationalized on the basis of the temperature experienced by nano-particles during thermal spraying. When thermal spraying is conducted with the CPSP≦240, the temperature experienced by most of the nano-particles is relatively low and thus most of the starting $\gamma$-$Al_2O_3$ or $\alpha$-$Al_2O_3$ powder particles achieve the densification through sintering rather than solidification. Therefore, when the starting $Al_2O_3$ is $\gamma$-phase, most of them transform to $\alpha$-phase. When the starting $Al_2O_3$ is $\alpha$-phase, no phase transformation occurs since $\alpha$-phase is a stable phase.

When a CPSP greater than or equal to 310 is used, the temperature experienced by most of the nano-particles is high and thus most $Al_2O_3$ particles have undergone through melting and solidification processes. As such, the phase transformation sequence during thermal spray becomes $\gamma$-$Al_2O_3$→Liquid→mostly $\gamma$-$Al_2O_3$, few $\alpha$-$Al_2O_3$ $\alpha$-$Al_2O_3$→Liquid→mostly $\gamma$-$Al_2O_3$, few $\alpha$-$Al_2O_3$ Thus, the coating is predominately composed of $\gamma$-$Al_2O_3$ regardless of the starting phases, as shown in Table 4. Metastable $\gamma$-phase as the major phase in the coating has been observed in all thermally sprayed commercial alumina coatings, and has been attributed to the rapid cooling rate ($10^6$–$10^7$ K sec$^{-1}$) provided by the substrate.

When the CPSP is between 240 and 310, a partial melting of powder particles results.
Thus, the phase transformation could be described by the following formula:

$\alpha$-$Al_2O_3$→Liquid+Solid→more $\gamma$-$Al_2O_3$, some $\alpha$-$Al_2O_3$ In this case, some powder particles are melted and solidify to form $\gamma$-$Al_2O_3$, while the other particles remain solid and therefore retain original $\alpha$-crystal structure.

Thus, the temperature and densification behavior experienced by nano-particles during thermal spray could be divided into three regimes in terms of the CPSP:

1. low particle temperature and densification mainly through sintering when CPSP≦240.
2. intermediate temperature and densification through sintering and solidification when CPSP is between 250 and 300.
3. high particle temperature and densification mainly through solidification when CPSP≧310.

Example 4

Density, Hardness and Grain Size of the Coating

The density, grain size, phase transformation, and microhardness of the sintered bodies were studied. Slide wear of various coatings against a $Si_3N_4$ ball of 0.25 inch diameter was conducted using a pin-on-disk tribometer. The load applied was 4.9 N and the sliding speed was 0.2 m/s. The test was conducted with or without lubricant. Further, a new wear track was used for each datum point and the wear rate was gauged using the width of the wear track.

The density of oxide coatings and sintered bodies was measured based on Archimedes' principle using water as media. Open pores in the coating or sintered body were taken into consideration by using the following equation:

$$\rho = \frac{W_{air}}{W'_{air} - W_{water}} \quad (1)$$

where $\rho$ is the density of the coating or sintered body, $W_{air}$ is the weight of the dry sample determined in air, $W'_{air}$ is the weight of the water-saturated sample determined in air, and $W_{water}$ is the weight of the water-saturated sample determined in water.

Phase identification of all the samples was carried out using x-ray diffraction (XRD) methods with CuKα radiation. The average size of crystallites was determined based on XRD peak broadening (e.g., the (101) reflection was used for anatase) using the Scherrer formula [14]:

$$B_p(2\theta) = \frac{0.9\lambda}{D\cos\theta} \quad (2)$$

In equation (2) D is the average dimensions of crystallites, $B_p(2\theta)$ is the broadening of the diffraction line measured at half maximum intensity, $\lambda$ is the wavelength of the x-ray radiation and $\theta$ is the Bragg angle. The correction for instrumental broadening was taken into account in the measurement of the peak broadening. This was done by comparing the breadth at half maximum intensity of the x-ray reflections between the sample and the $LaB_6$ standard [15]

$$B_p^2(2\theta) = B_h^2(2\theta) - B_f^2(2\theta) \quad (3)$$

where $B_p(2\theta)$ is the half-maximum breadth if there were no instrumental broadening, and $B_h(2\theta)$ and $B_f(2\theta)$ are the breadth from the samples and the $LaB_6$ standard, respectively. The contribution from internal strains was neglected because it was found that the broadening due to internal strains was negligible in comparison to that due to fine crystallites in the oxide samples we studied.

The morphology and size of various powders were characterized using an environmental scanning electron microscope (Phillips ESEM 2020). Particle morphology observation and crystal structure determination were also performed on a Philips EM420 analytical transmission electron microscope coupled with selected area electron diffraction (SAED) and micro-diffraction.

The density and hardness of the oxide coatings also exhibit strong dependency on the I.V/Ar ratio and thus the spray temperature, as shown in Table 4. Both hardness and density increase with increasing spray temperature. Since hardness and density increase simultaneously, it is likely that the increase in microhardness is due to the increase in the coating density rather than due to the change of the phase content.

Figure 4:
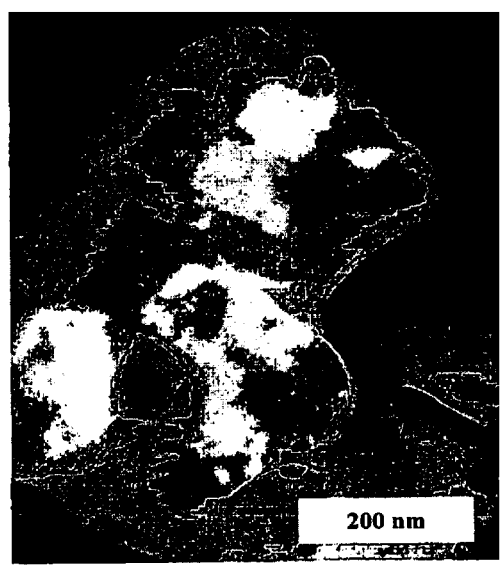
FIG. 4 shows TEM image of a nanostructured powder coating deposited with a high spray temperature (CPSP=330).

The grain size of the coating is also a function of the spray temperature. A TEM image of a nanostructured powder coating deposited with a high spray temperature (CPSP=310) is shown in FIG. 4. It can be seen that most of the grains are in the 100–300 nm size range, while pockets of fine grains with sizes of 20–50 nm are also present. Selected area electron diffraction indicates that large grains are α-$Al_2O_3$, whereas nanostructured grains are γ-$Al_2O_3$. Amorphous phases are also found in the sample. Thus, the high spray temperature has resulted in a large volume fraction of submicrometer-sized grains.

Example 5

Wear Resistance of the Coating

Figure 5:
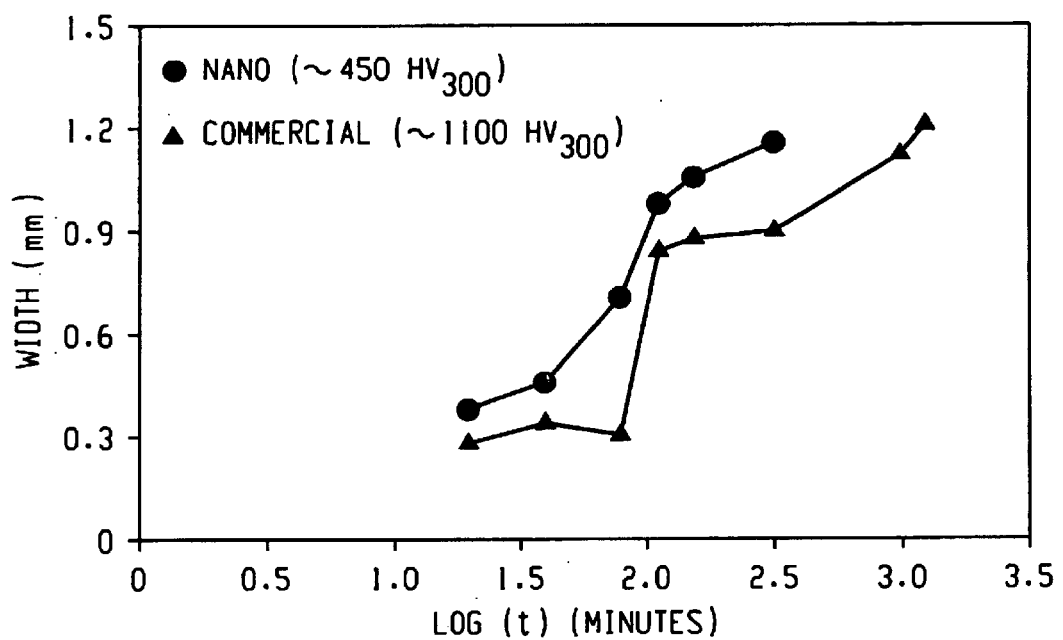
FIG. 5 shows the wear track width of coatings against a $Si_3N_4$ ball as a function of wear time. The nanostructured powder coating was deposited with a low spray temperature (CPSP=200).
Figure 6:
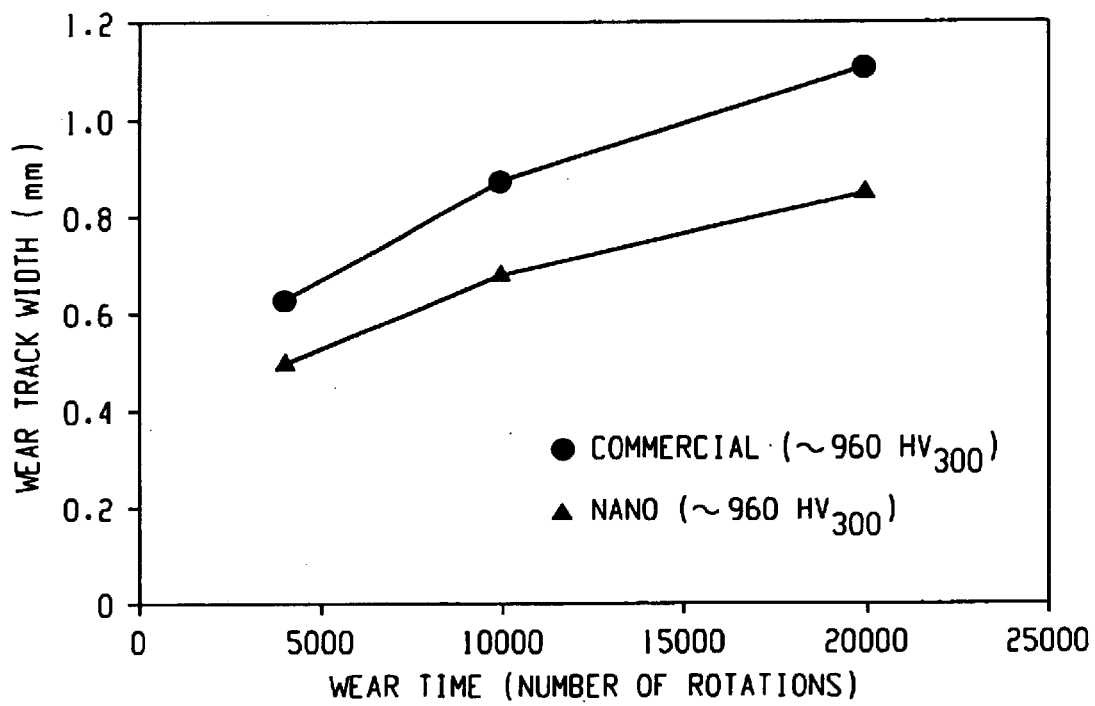
FIG. 6 shows the wear track width of coatings against a $Si_3N_4$ ball as a function of wear time. The nanostructured powder coating was deposited with a high spray temperature (CPSP=330).

Sliding wear resistance of coatings as a function of wear time is shown in FIGS. 5 and 6. As expected, hardness has a strong influence on wear resistance. The higher the hardness, the better the wear resistance. However, grain size also has effects on wear resistance. For example, FIG. 5 shows that even though the nanostructured coating has a hardness about half of the commercial coating, its wear resistance is already very close to that of the commercial coating. FIG. 6 also provides the same trend, i.e., the nanostructured coating has higher wear resistance than the commercial coating although its hardness is lower than the commercial coating. A related study on abrasive wear has revealed that nanostructured coatings could have 2 to 4 folds increase in wear resistance in comparison with commercial coatings.

Example 6

Structure of Reconstituted Powders

The nanostructured $Al_2O_3$ and $TiO_2$ powders employed in this study were obtained from Nanophase Technology Corporation, Burr Ridge, Ill. The powders have a mean diameter of 50 and 70 nanometers (nm), respectively. These powders were blended to produce a powder mixture with composition equivalent to commercially available Metco-130 (87 wt % $Al_2O_3$ and 13 wt % $TiO_2$). In addition, small amounts of nanostructured $CeO_2$ and $ZrO_2$ were added during mixing for a modified nanostructured powder. The mixed powders were then reconstituted to form micrometer-size agglomerates (40–70 micrometers) that are large enough to be used commercial powder feeders. The process of reconstitution consists of spray drying a slurry containing nano-alumina and nano-titania particles and subsequent heat treatment at high temperature (about 800 to about 1200° C.). Plasma reprocessing of the powders was carried out for the alumina-titania coatings modified with $CeO_2$ and $ZrO_2$ additives (also described as modified nano alumina-titania). Characterization of the reconstituted agglomerates, as well as Metco-130 powders, were carried out by X-ray diffraction (XRD) and electron microscopy for phase identification and examination of agglomerate size, shape, morphology and structure.

Figure 7:
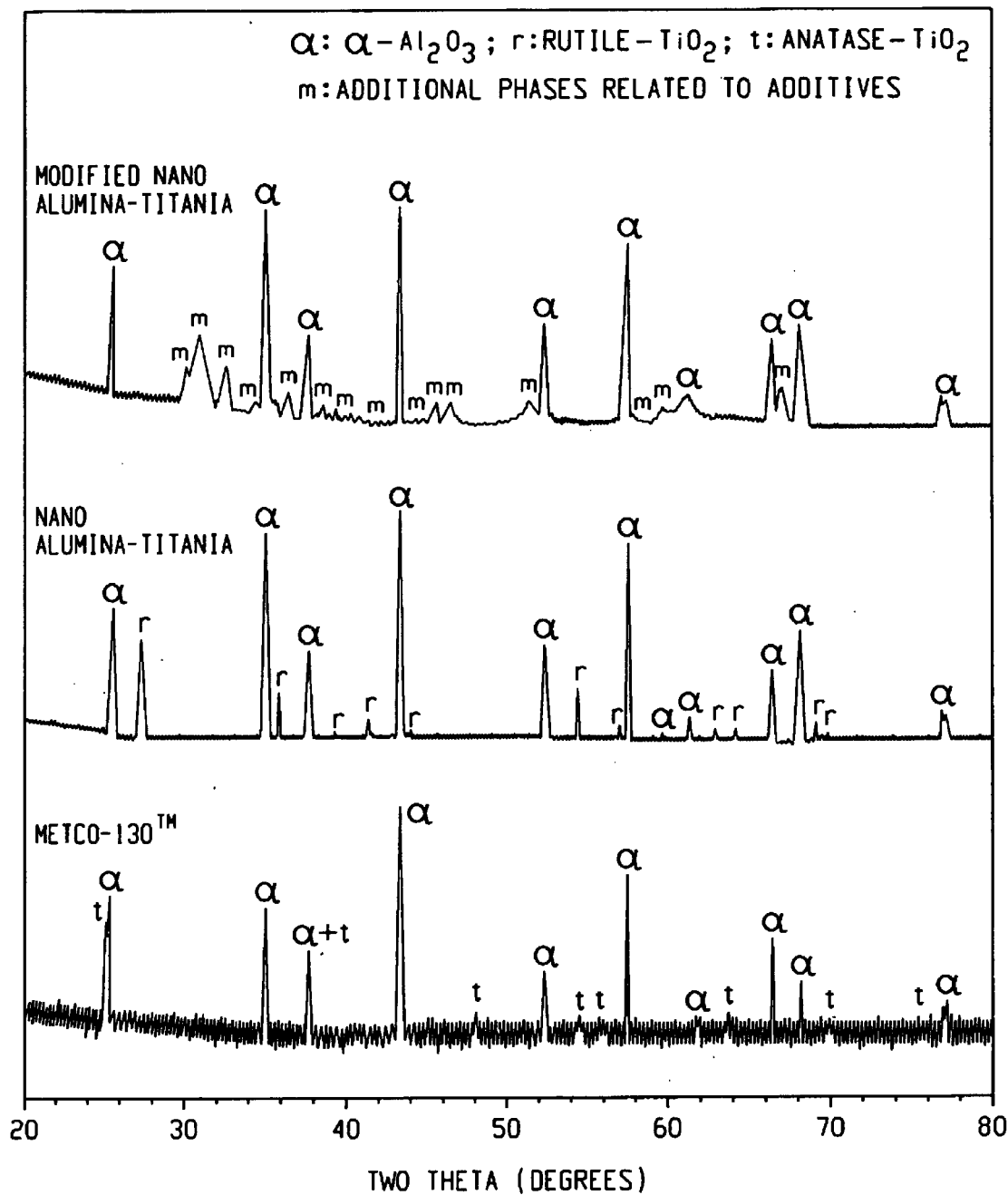
FIG. 7 shows X-ray diffraction patterns obtained from Metco-130 powders and reconstituted alumina-titania powders with and without additives.

FIG. 7 shows the XRD patterns from the Metco-130 powders, nanostructured alumina-titania and modified nanostructured alumina-titania agglomerates. While the Metco-130 powders consisted of α-$Al_2O_3$ and anatase-$TiO_2$, nanostructured alumina-titania agglomerates consisted of α-$Al_2O_3$ and rutile-$TiO_2$. The modified nanostructured alumina-titania agglomerates consisted of α-$Al_2O_3$ and anatase-$TiO_2$. Additional diffraction peaks from (Zr, Ce)$O_2$ phases were observed for modified agglomerates as shown in FIG. 7. Previous work, using x-ray diffraction, has demonstrated that the grain size of α-Al$_2$O$_3$ and anatase-TiO$_2$ is smaller than 100 nanometers while electron microscopy showed that the grain size of rutile-TiO$_2$ is smaller than 1000 nanometers.

Figure 8:
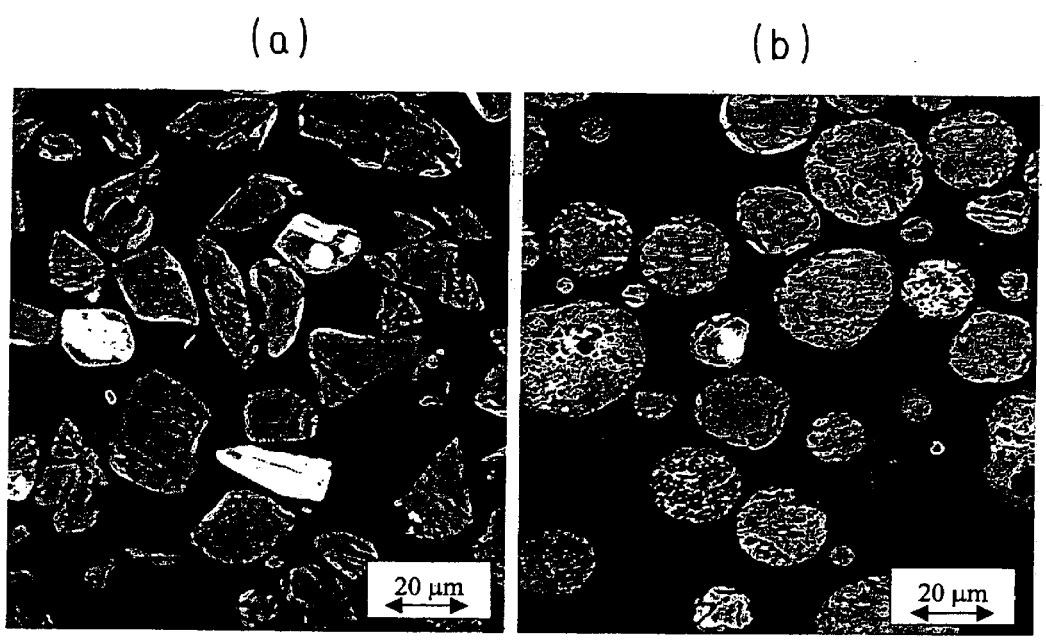
FIG. 8 shows backscattered electron micrographs of (a) Metco-130 and (b) modified nano alumina-titania powders prior to plasma spray.

The structure of the starting powder/agglomerates were studied by using both optical and electron microscopy. Cross-sectional backscattered electron micrographs of Metco-130 and modified nano alumina-titania coatings after plasma reprocessing are presented in FIG. 8. Based on Saltykov analysis of cross-sectional photomicrographs, the mean particle size was estimated to be 40 to 70 micrometers. The reconstituted agglomerates have a spherical morphology, while the Metco-130 powders have an irregular shape. The compositional contrast from backscattered electron micrographs illustrates that the distribution of Al$_2$O$_3$ (dark) and TiO$_2$ (light) is significantly different for Metco-130 powders and modified nano agglomerates. Typical energy dispersive spectra (EDS) from the dark phase show the presence of Al and the light phase reveals the presence of Ti and Al. With the understanding that the resolution of the EDS is of the order of a micrometer and extraneous signals do contribute to the analysis, it can be concluded that the distribution of the two phases is much finer for nanostructured agglomerates (FIG. 8(b)).

Figure 9:
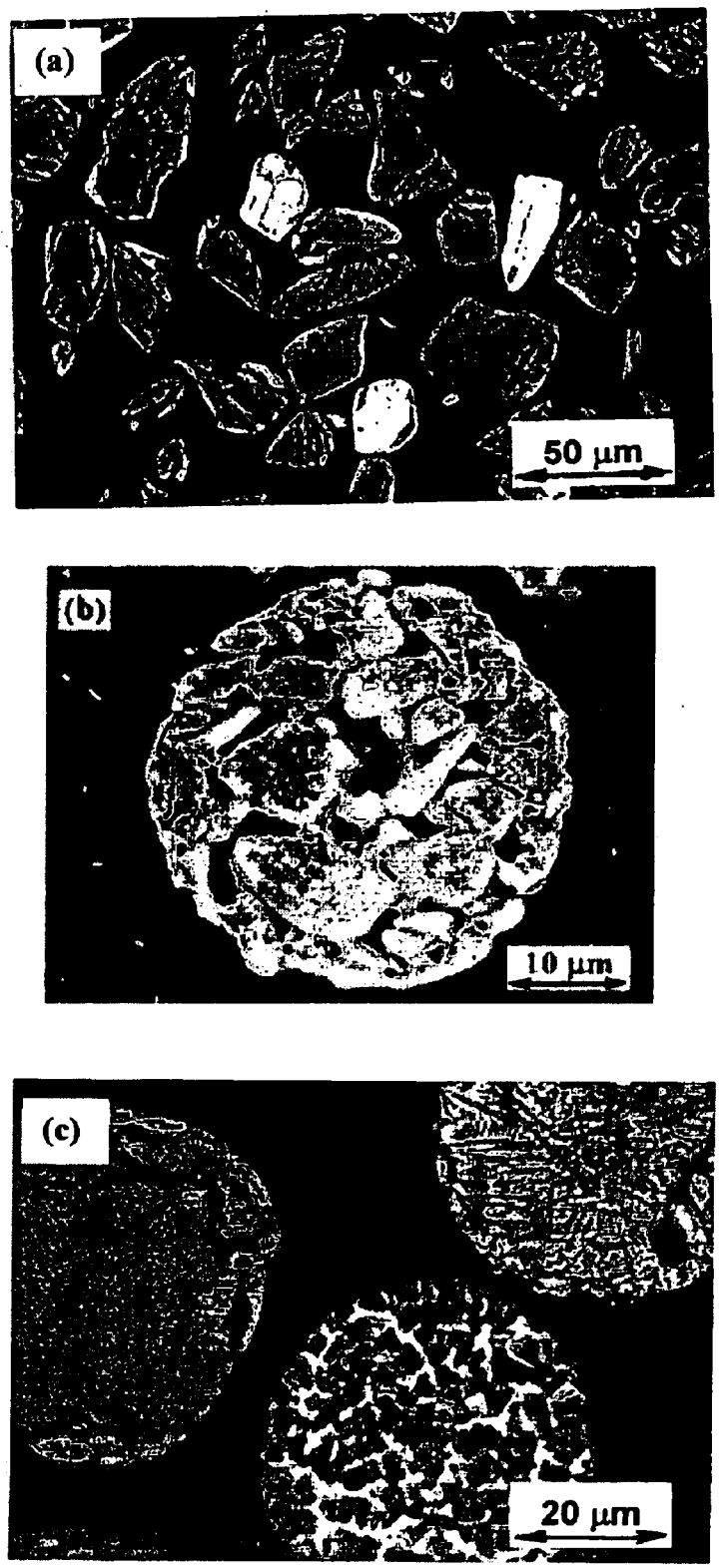
FIG. 9 shows backscattered electron micrographs of (a) Metco-130 powders and reconstituted (b) $Al_2O_3$-13 wt % $TiO_2$ without additives and (c) with additives.

FIG. 9 shows the cross-sectional backscattered electron micrographs of Metco-130 and reconstituted, unmodified and modified nanostructured powders. The Al$_2$O$_3$ took the form of α-Al$_2$O$_3$ for all the powders (dark regions in FIG. 9), while the TiO$_2$ was in the form of anatase-TiO$_2$ for the Metco-130 powders and rutile TiO$_2$ for unmodified powders. TiO$_2$ was dissolved in oxide additives for the modified powders (light regions in FIG. 9).

The phase constituents of the reconstituted nanostructured agglomerates can be related to processing conditions. For nanostructured 87 wt % Al$_2$O$_3$-13 wt % TiO$_2$, heat treatment at high temperature produces the equilibrium phase for both Al$_2$O$_3$ and TiO$_2$ (e.g., α-Al$_2$O$_3$ and rutile-TiO$_2$). However, for nanostructured 87 wt % Al$_2$O$_3$-13 wt % TiO$_2$ with CeO$_2$ and ZrO$_2$ additives, plasma reprocessing after the heat treatment yields the non-equilibrium phase of TiO$_2$. The disappearance of the rutile-TiO$_2$ phase indicates that melting has occurred during the plasma reprocessing of the heat-treated powders. Thus, the presence of equilibrium α-Al$_2$O$_3$ and non-equilibrium anatase-TiO$_2$ may arise following the plasma reprocessing from an air-quench that is rapid enough to form anatase-TiO$_2$. As shown in FIG. 8(b), variation in the structure, ranging from dendritic-solidification structure to partially molten (i.e., liquid phase sintered) morphology was observed for the modified nano-agglomerates. This inhomogeneity may be due to the variation in particle size and thermal history that individual particles experience during plasma reprocessing.

Example 7

Constituent Phases and Microstructure of Plasma Sprayed Coatings

Plasma spray of the reconstituted agglomerates and Metco-130 powders was carried co 9 MB plasma torch and GH nozzle. The coatings were deposited up to 300 micrometers thick on mild carbon steel substrates of various geometries specifically designed for specific mechanical property tests. The plasma spray of oxide coatings in this study was carried out as a function of a critical plasma spray parameter (CPSP). Other processing variables such as carrier gas flow rate, spray distance, flow rate ratio of argon to hydrogen, powder feed rate, gun speed, etc., were held constant. Under these controlled processing conditions, CPSP can be directly related to the temperature of the plasma and/or the particles. The alumina-titania coatings deposited by plasma spraying at various CPSP values are summarized in Table 5.

TABLE 5

| CPSP | Commercial coating Metco-130 | Nano-alumina-titania | Modified nano-alumina-titania[a] |
|---|---|---|---|
| 270 | — | S270 | — |
| 300 | C300 | S300 | M300 |
| 325 | C325 | S325 | M325 |
| 350 | — | — | M350 |
| 390 | — | — | M390 |
| 410 | C410 | — | M410 |

[a]Modified with small amounts of other additives

For each specific CPSP condition, a total of 20 specimens were plasma sprayed concurrently using an apparatus that held all 20 mild steel substrates (approximately 2 mm in thickness). Among these 20 specimens, 4 coupons (2.54 cm in diameter) were coated for modified ASTM-C633-79 direct pull-test, 4 coupons (2.54 cm in diameter) for abrasive wear test, 4 plates (5 cm×5 cm) for cup test, 4 plates (6 cm×5 cm) for bend test and 4 plates (5 cm×5 cm) for sliding wear test. Schematic illustrations of the cup test and the bend test are presented in FIG. 10. Also, microhardness and indentation crack growth resistance of the coatings were measured using Vickers indentation technique (HV$_{300}$ and HV$_{3000}$, respectively) and the amount of porosity in the coatings was estimated from electron micrographs by quantitative image analysis. In addition, constituent phases were characterized by x-ray diffraction and an estimate of the volume fraction of microstructural features that developed during the plasma spray was performed using quantitative image analysis.

XRD patterns from all plasma sprayed coatings consist of α- and γ-Al$_2$O$_3$; peaks from the TiO$_2$ phase were not observed. The actual crystal structure regarding γ-Al$_2$O$_3$ phase may contain Ti ions substitutionally. The relative integrated intensities of the α- and γ-Al$_2$O$_3$ peaks (K$_\alpha$ radiation) were calculated and examined as a function of critical plasma spray parameter. The XRD patterns, near the (113) α-Al$_2$O$_3$ and (400) γ-Al$_2$O$_3$ for modified nano alumina-titania coatings, shown in FIG. 11, demonstrate that the relative integrated intensity of these peaks depends on the critical plasma spray parameter (CPSP). Such an observation was examined quantitatively by plotting the ratio of relative integrated intensity, $(E_{K_\alpha}^{\alpha-Al_2O_3}/E_{K_\alpha}^{\gamma-Al_2O_3})$ as a function of CPSP as shown in FIG. 12. The ratio $(E_{K_\alpha}^{\alpha-Al_2O_3}/E_{K_\alpha}^{\gamma-Al_2O_3})$ increases with a decrease in CPSP for nano and modified-nano alumina-titania coatings. However, for Metco-130 coatings, such a variation was not observed because these coatings consist mainly of γ-Al$_2$O$_3$, independent of CPSP.

Figure 13:
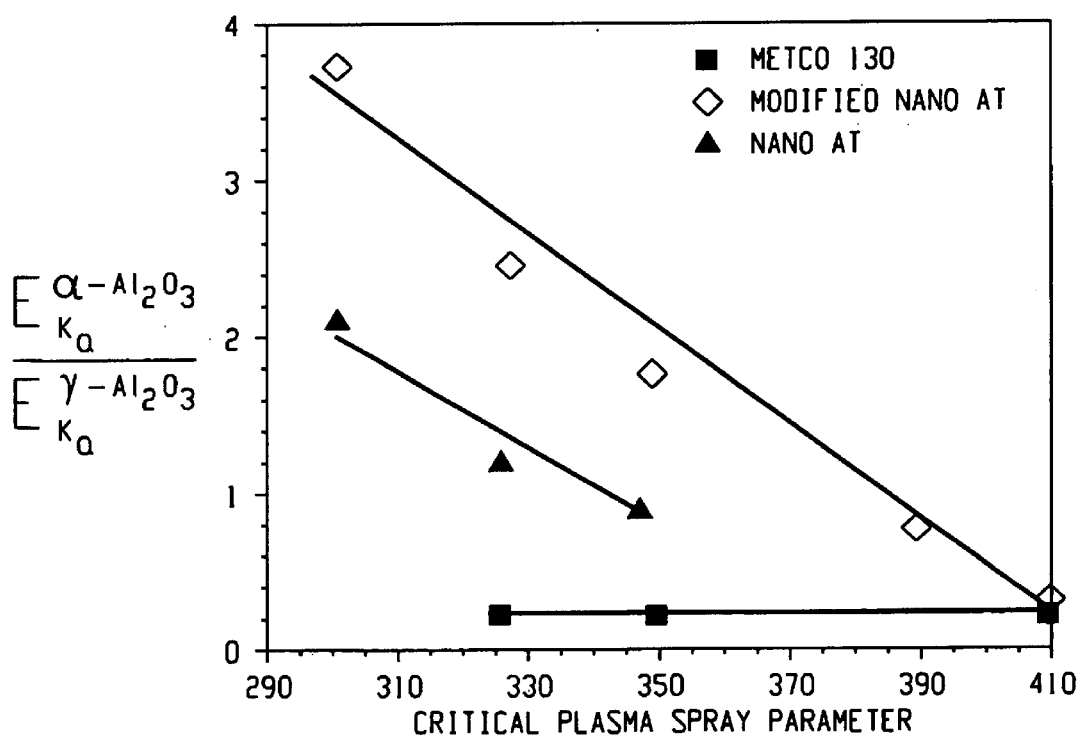
FIG. 13 shows the volume percent of $\gamma$-$Al_2O_3$ in $Al_2O_3$-13 wt % $TiO_2$ coatings as a function of CPSP, measured using X-ray diffraction patterns with external standards. The plasma torch/particle temperature can be directly related to CPSP.

FIG. 13 shows the volume percent of γ-Al$_2$O$_3$ determined by quantitative X-ray diffraction as a function of CPSP, and, in turn, a function of plasma torch/particle temperature. The volume percent of γ-Al$_2$O$_3$ increases with increasing CPSP for coatings plasma sprayed with reconstituted nanostructured powders up to CPSP=390. The volume percentage of γ-Al$_2$O$_3$ for the Metco-130 coatings remains unchanged as a function of CPSP up to CPSP=390. All coatings show a slight decrease in the percent of gamma-Al$_2$O$_3$ at CPSP=410. These variations in the phase constituents as a function of CPSP can be explained based on the starting powder morphology and the plasma spray process. (i.e., melting and splat quenching). Metco-130 coatings were sprayed using dense alpha-$Al_2O_3$ powder. This powder melts in the torch and is splat quenched to form metastable gamma-$Al_2O_3$ in the coating. However, for porous reconstituted nanoporous powders with lower thermal conductivity, the amount of $\gamma$-$Al_2O_3$ increased with CPSP up to 390. This observation indicates that the nano-powder agglomerates that are partly melted and retain $\alpha$-$Al_2O_3$ from the powder coating. The increase in the amount of $\alpha$-$Al_2O_3$ at CPSP=410 can be attributed to a solid phase transformation that occurs after rapid solidification as a result of substrate heating.

Figure 14:
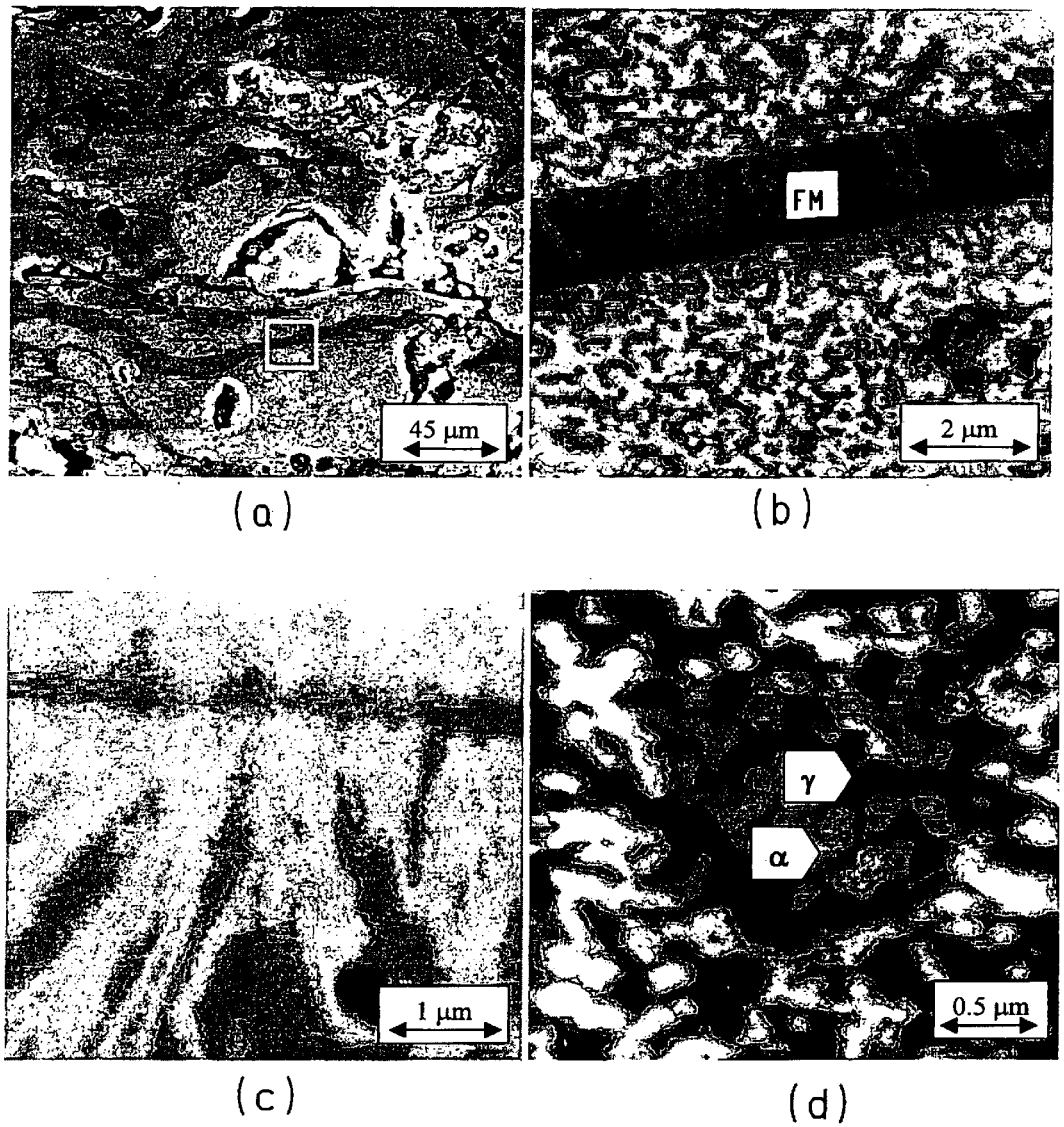
FIGS. 14a–d are secondary electron photomicrographs from plasma sprayed (CPSP=270) nanostructured alumina-titania coatings.

A typical structure of a plasma sprayed nanostructured alumina-titania coating is presented in FIG. 14. The contrast of the photomicrographs in FIG. 14 originates from electron charging during secondary electron imaging and was found to be the opposite of the compositional contrast in backscattered electron images. The coating consists of two distinctive structures, identified by a fully melted (FM) region, where columnar grains within lamellar splats are observed, and a partially melted (PM) region, where some microstructural features of the original particles are observed. These microstructural features include sintered $Al_2O_3$ particles embedded in a matrix of $Al_2O_3$—$TiO_2$ matrix. In general, the shape of the FM region is found to be lamellar, while that of the PM region is non-uniform, ranging from sphere to lamellae. In FIG. 14(d), the lighter phase corresponds to an $Al_2O_3$ phase and the darker phase corresponds to a Ti-containing $Al_2O_3$ phase, based on the EDS analysis. From the structure of FM and PM regions, it can be inferred that the FM regions consist of splat quenched $\gamma$-$Al_2O_3$ phase and the PM regions consist of sintered $\alpha$-$Al_2O_3$ particles, embedded in a matrix of $\gamma$-$Al_2O_3$ that forms from melting and solidification.

Quantitative determination of grain size by XRD cannot be carried out for the plasma sprayed coatings because the presence of non-uniform residual stresses may interfere with the measurement. However, FIG. 14(c) shows that the splat-quenched FM region contains nano and submicron-sized columnar grains. Also, the size of the $\alpha$-$Al_2O_3$ particles, embedded in the PM region as a result of incomplete melting of the starting agglomerate in the coatings, ranges from 100 nm to 2000 nm, as shown in FIG. 14(d).

An example of the bimodal or duplex microstructure of the plasma sprayed modified alumina-titania coating is shown in FIG. 15. Region "F" corresponds to fully-melted and splat-quenched regions ($\gamma$-$Al_2O_3$) while region "P" corresponds to a partially melted region where the initial microstructure of the reconstituted nanostructured agglomerates is retained. The partially melted region consists of $\alpha$-$Al_2O_3$ particles (black; less than 1 micrometer in size) embedded in $\gamma$-$Al_2O_3$ (white) supersaturated with $Ti^{+2}$. The modified nanostructured coatings were similar in microstructure with slightly larger $\alpha$-$Al_2O_3$ particulates (0.5–3 micrometers). This unique, bimodal or duplex microstructure is only obtained by plasma spray of reconstituted nanostructured powders.

Extensive transmission microscopy also confirmed the bimodal microstructure. While coatings plasma sprayed from Metco-130 powders contain mostly $\gamma$-$Al_2O_3$, the coatings plasma sprayed with reconstituted nanostructured powders contained both splat-quenched $\gamma$-$Al_2O_3$ and retained $\alpha$-$Al_2O_3$. It was also found that the grain size of the splat-quenched $\gamma$-$Al_2O_3$ was extremely small (20–70 nanometers) while that of the $\alpha$-$Al_2O_3$ was approximately 0.5–3 micrometers. FIGS. 15c and d show the microstructure of plasma prayed nanostructured coating (unmodified) that includes nano-grained $\gamma$-$Al_2O_3$ and submicron/micron-grained $\alpha$-$Al_2O_3$.

The contrast brought out by charging during secondary electron imaging, such as shown in FIG. 14(a), has been examined quantitatively by automated image analysis as a function of CPSP. The PM regions appear brighter in the secondary electron images and consist of microstructural features that are retained from the original particles prior to plasma spray. The fraction of the coating structure, represented by PM, evaluated by quantitative image analysis as a function of CPSP, is presented in FIG. 16. An increase in the fraction of PM region is observed with a decrease in the CPSP, which can be related to the temperature of the plasma torch and/or particle temperature. Complete melting and a splat-quenched structure were observed for Metco-130 coatings plasma sprayed at various CPSP. This result is consistent with the fact that Metco-130 coatings consist primarily of $\gamma$-$Al_2O_3$ independent of CPSP. The fraction of the coating microstructure, represented by region "P" decreases with increasing CPSP and the corresponding increase in plasma torch/particle temperature. Near-complete melting followed by splat quenching was observed at relatively high CPSP, corresponding to an increase in microstructural region "F" with increasing CPSP. Therefore, it can be concluded that splats, which formed through melting the feed powder and rapid solidification, consisted of nanometer-sized $\gamma$-$Al_2O_3$, whereas the particulate microstructure, which was formed via partial melting and liquid phase sintering, consisted of submicrometer-sized $\alpha$-$Al_2O_3$ with small amounts of nanometer-sized $\gamma$-$Al_2O_3$. Furthermore, the duplex distribution of the microstructured coating can be controlled by CPSP.

For plasma sprayed alumina-titania coatings, only $\alpha$-$Al_2O_3$ and $\gamma$-$Al_2O_3$ phases were found and $TiO_2$ phases were absent. Since the solubility of $TiO_2$ in the equilibrium $\alpha$-$Al_2O_3$ is negligible, Ti ions are likely to be in the $\gamma$-$Al_2O_3$ lattice as either an interstitial or substitutional defect. Without being bound by theory it is believed that the plasma sprayed 87 wt % $Al_2O_3$-13 wt %$TiO_2$ coatings contain a non-equilibrium $\chi$-$Al_2O_3$.$TiO_2$ phase in which Ti ions randomly occupy the $Al^{3+}$ lattice sites in the $\gamma$-$Al_2O_3$ structure. The peak positions of x-ray diffraction for $\chi$-$Al_2O_3$.$TiO_2$ phase are identical to those of $\gamma$-$Al_2O_3$, however the relative intensity of peaks is different. The formation of $\chi$-$Al_2O_3$.$TiO_2$ phase probably originates from rapid liquid-to-solid transformation, which is expected during the plasma spray process and provides reasonable explanation for the absence of Ti-containing phase. The non-equilibrium phase observed in this study can be identified as the $\chi$-$Al_2O_3$.$TiO_2$ phase by virtue of having the appropriate position and intensity of XRD peaks. Thus, the plasma sprayed nanostructured alumina-titania coatings consist of equilibrium $\alpha$-$Al_2O_3$ and non-equilibrium $\chi$-$Al_2O_3$.$TiO_2$ phase.

Figure 11:
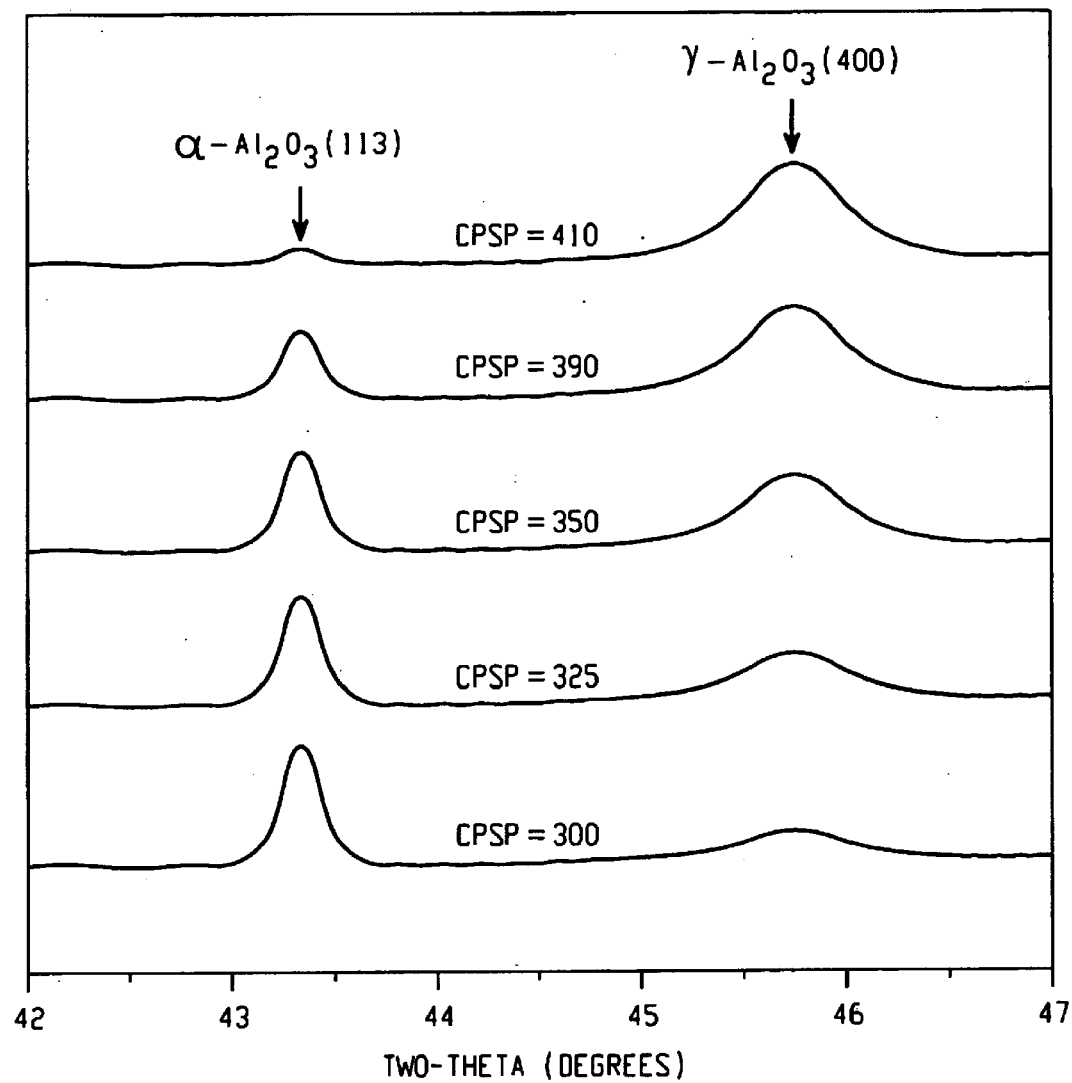
FIG. 11 is X-ray diffraction patterns from (113) $\alpha$-$Al_2O_3$ and (400) $\gamma$-$Al_2O_3$ peaks for modified nano alumina-titania coatings.
Figure 12:
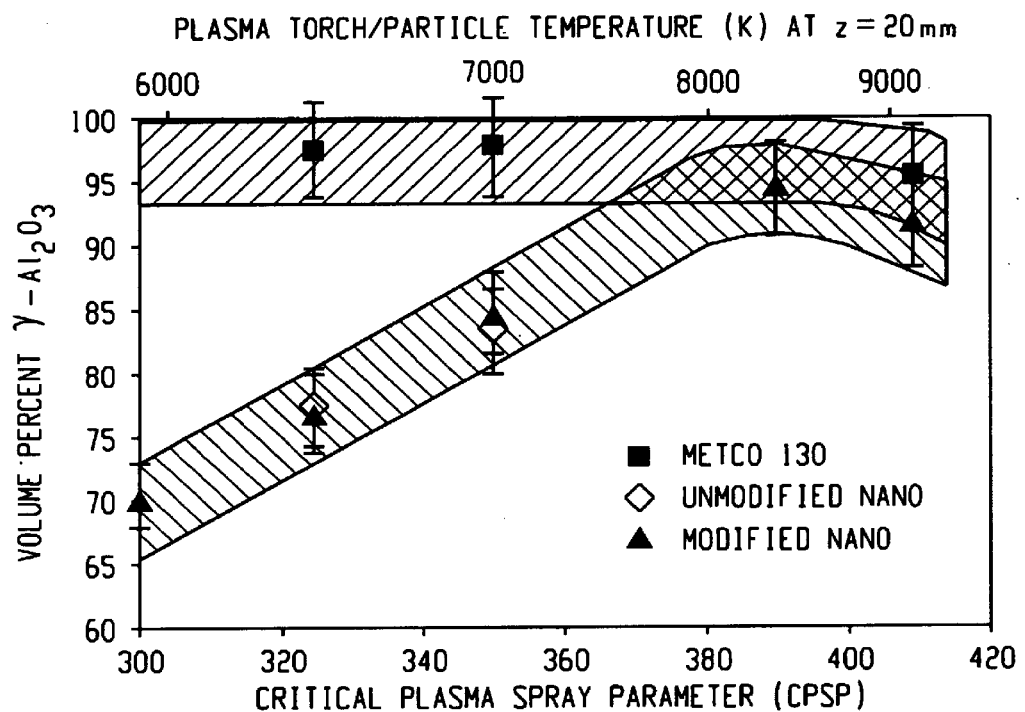
FIG. 12 is graph demonstrating the ratio of relative integrated intensity of (113) $\alpha$-$Al_2O_3$ and (400) $\gamma$-$Al_2O_3$ peaks, ($E_{K_\alpha}^{\alpha-Al_2O_3}/E_{K_\alpha}^{\gamma-Al_2O_3}$) calculated from x-ray diffraction patterns as a function of CPSP.

The results from XRD after plasma spray, as presented in FIGS. 11 and 13, indicate that the amount of $\alpha$-$Al_2O_3$ increases as the CPSP decreases. Since a decrease in the CPSP can be related to a decrease in plasma torch and/or particle temperature, the presence of $\alpha$-$Al_2O_3$ in the alumina-titania coatings plasma sprayed from reconstituted nano-powder can be attributed to incomplete melting of the feed agglomerates. Quantitative image analysis shown in FIG. 16, has also demonstrated that the regions containing unmelted nano-$Al_2O_3$ particles, identified within the PM region in FIG. 14, increase with a decrease in CPSP. These results from XRD, microscopy and quantitative image analysis, consistently indicate that the presence of $\alpha$-$Al_2O_3$ in the plasma sprayed alumina-titania coatings is a result of incomplete melting of the feed agglomerates. Based on this study, the phase transformation of $Al_2O_3$ as a function of CPSP can be summarized as shown in Table 6.

TABLE 6

| Starting powder | CPSP | Constituent phases and transformations | | |
|---|---|---|---|---|
| | | Powder | During plasma spray | Coating |
| Commercial powder | All | α | Liquid | γ[c] |
| Reconstituted nanostructured powder | Low and intermediate | α | Solid | α |
| Reconstituted nanostructured powder | Low and intermediate | χ | Liquid | γ[c] |
| Reconstituted nanostructured powder | High | α | Liquid | γ[c] |

[c]Can be referred to as $\chi$-$Al_2O_3$—$TiO_2$ phase

Variation in the amount of α- and γ-$Al_2O_3$ as a function of CPSP was not observed for Metco-130 coatings. Regardless of variation in the CPSP, Metco-130 coatings consisted primarily of γ-$Al_2O_3$, indicating that the commercial powders were completely melted and splat-quenched during plasma spray. The unchanging structure and mechanical properties of the Metco-130 with CPSP support this observation.

The grain size for the metastable $\chi$-$Al_2O_3$.$TiO_2$ phase was in the nano-scale. FIG. 14(c) shows that the $\chi$-$Al_2O_3$.$TiO_2$ phase corresponding to the splat-quenched FM region observed by electron microscopy in this study consists of nanostructured grains. In addition, FIG. 14(d) shows the nano/submicron size of the α-$Al_2O_3$ particles embedded in the alumina-titania coatings plasma sprayed from reconstituted nanostructured powders.

Example 8

Properties of the Plasma Sprayed Coatings

Physical and mechanical properties, including density, hardness, indentation crack growth resistance, adhesive strength, spallation resistance in bend and cup-tests, and resistance to abrasive and sliding wear, of the plasma sprayed coatings were evaluated. These properties were also examined as a function of CPSP and compared to the Metco-130 coatings.

Figure 17:
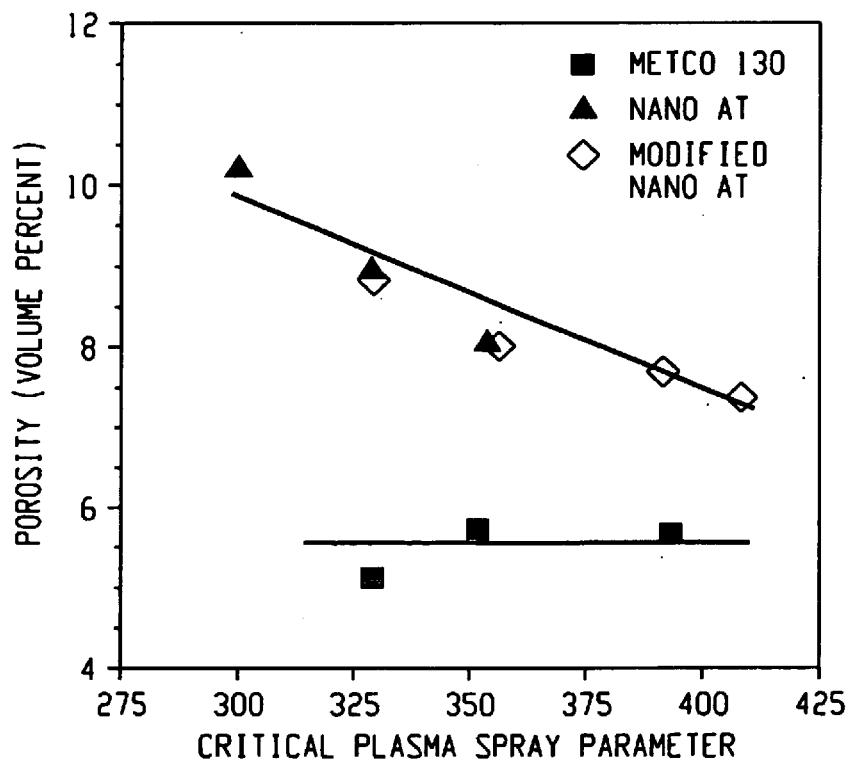
FIG. 17 is a graph depicting the percentage of porosity, determined by quantitative image analysis as a function of CPSP.

Based on quantitative image analysis, the amount of porosity was evaluated for three coating systems as a function of CPSP, as shown in FIG. 17. A decrease in porosity was observed for both nanostructured and modified-nanostructured alumina-titania coatings with an increase in the CPSP. No variation was observed for Metco-130.

Figure 18:
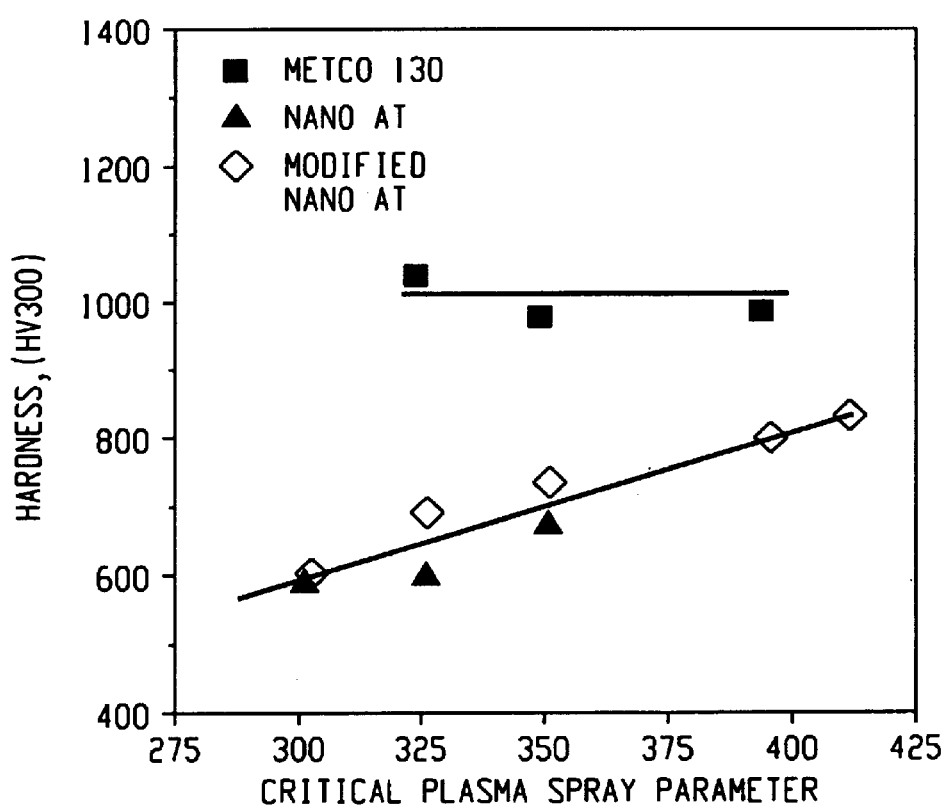
FIG. 18 is a graph depicting hardness ($HV_{300}$) measured on plasma sprayed alumina-titania coatings as a function of CPSP.

In FIG. 18, the indentation hardness ($HV_{300}$) for the three coatings as a function of CPSP is presented. While no variation was observed for Metco-130 coatings, an increase in hardness was observed for nanostructured coatings.

Figure 19:
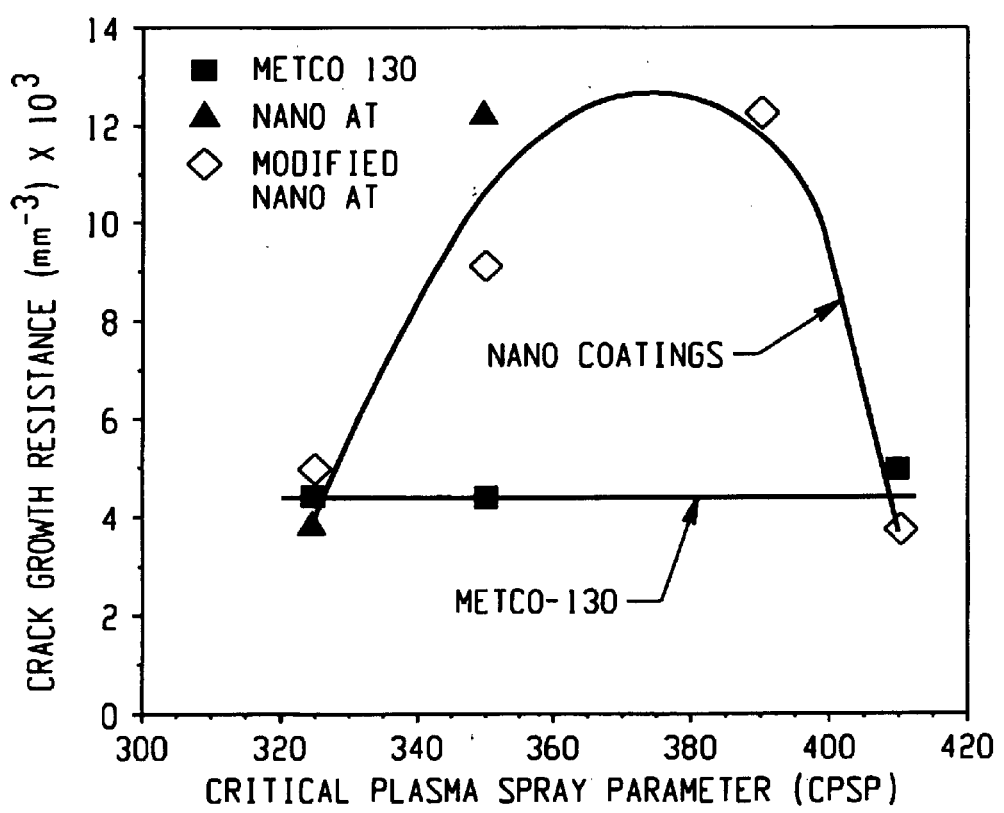
FIG. 19 is a graph depicting indentation crack resistance of plasma sprayed alumina-titania coatings as a function of CPSP.
Figure 20:
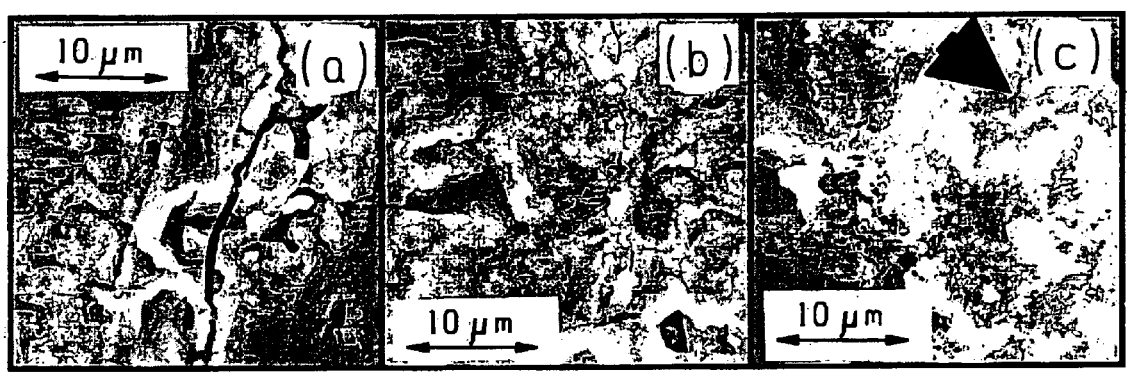
FIG. 20 shows indentation cracks observed for (a) Metco-130 and (b, c) nanostructured alumina-titania coatings. (a) Long, wide cracks along the splat boundaries were observed for Metco-130 coatings; (b, c) short, narrow cracks arrested at partially melted regions (arrow) were observed for nanostructured alumina-titania coatings.

Indentation crack-growth-resistance of the coatings was also estimated by measuring the length of the two horizontal cracks originating from the corners of the Vickers indentation. A maximum value in the indentation crack growth resistance was observed for nanostructured alumina-titania coatings at an intermediate CPSP (≈350) as shown in FIG. 19. The indentation crack growth resistance of the Metco-130 coatings remain the same as a function of CPSP. Cracks propagating through splat boundaries are arrested and/or deflected after encountering the partially melted regions in the coating (FIG. 20).

Figure 10:
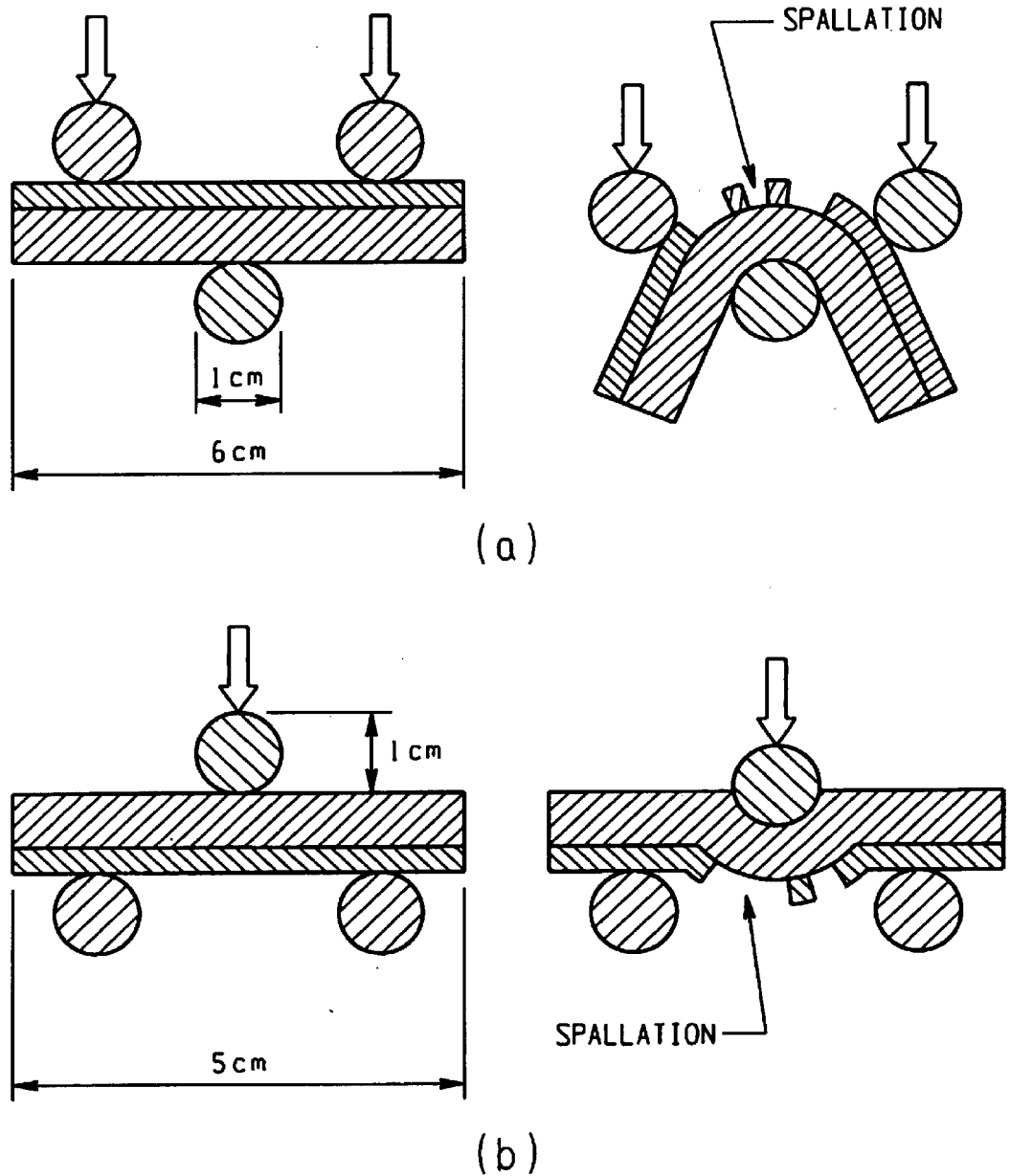
FIG. 10 is a schematic illustration of (a) bend and (b) cup tests carried out for plasma sprayed alumina-titania coatings.

Alumina-titania coatings, plasma sprayed on plate (6 cm×5 cm) substrates, were subjected to bend and cup test, as schematically illustrated in FIG. 10. For each coating type and CPSP, four specimens were tested. Based on visual inspection, the coatings in the bend test were categorized into three groups: (a) complete failure, (b) partial failure and (c) pass. Representative photographs of these results are presented in FIG. 21. Significant spallation, identified as complete failure, was observed for all Metco-130 coatings. However, for nanostructured alumina-titania coatings, partial failure and pass were observed as reported in Table 7. The nanostructured coatings were resistant to bend-failure at lower CPSP.

TABLE 7

| CPSP | Commercial coating Metco-130 | Nano-alumina-titania | Modified nano alumina-titania[a] |
|---|---|---|---|
| 300 | Complete failure | Partial Failure | Pass |
| 325 | Complete failure | Partial Failure | Pass |
| 350 | | | Partial Failure |
| 410 | Complete failure | | |

[a]Modified with small amounts of oxide additives

The coatings exhibited similar behavior in cup-tests. While Metco-130 coatings exhibited significant cracking and spallation as shown in FIG. 22(a), only minimum spallation was observed without cracking for nanostructure alumina-titania coatings as shown in FIG. 22(b).

Figure 23:
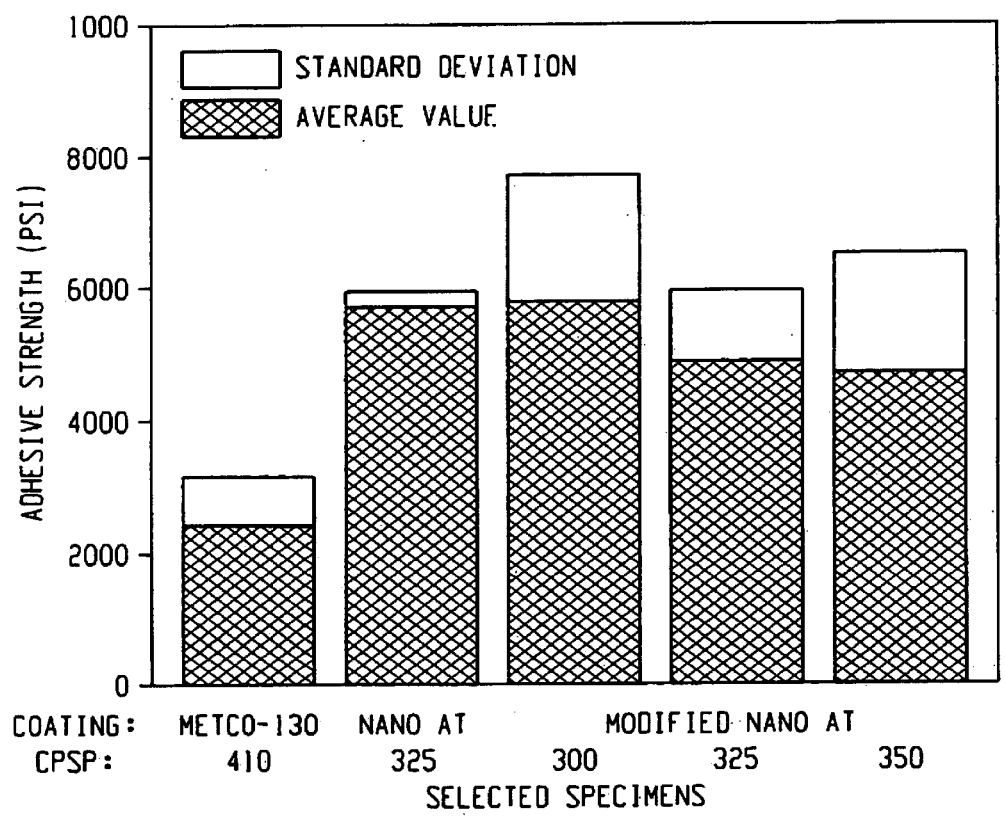
FIG. 23 is a graph depicting adhesive strength of selected alumina-titania coatings measured by modified direct-pull tests.

Adhesive strength of the coatings was measured using the modified ASTM direct-pull test. Significant improvement (greater than about 2 times) was observed for nanostructured coatings deposited at selected CPSP's compared to Metco-130 deposited according to manufacturer's recommendation, e.g., CPSP=410, as shown in FIG. 23. The value of the adhesion strength for the Metco-130 agreed with that specified by the manufacturer.

TABLE 8

Bond strength of Alumina/Titania, and Chromia/Titania

| Materials | Average bond strength (psi) |
|---|---|
| Chromia/Titania 1,300° C. heat treatment | 6,726.9 |
| Chromia/Titania 1,300° C. heat treatment + plasma densified | 6,047.9 |
| *Metco-136F | 4,562.4 |
| Alumina/Titania 1,200° C. heat treated | 3,500 |
| Alumina/Titania 1,200° C. heat treated + plasma densified | 7,000~9,000 |
| Alumina/Titania as-spray dried | 5,500 |
| *Metco-130 | 1,900 |

*denotes control materials

As can be seen in Table 8, duplex microstructured Chromia/titania coatings have improved bond strengths as compared to Metco-136F. Even more pronounced are the effects for duplex microstructured alumina/titania as compared to Metco-130 where bond strength improvements of about 3.5-fold to about almost 5-fold in bond strength are observed with the duplex microstructured material.

Figure 24:
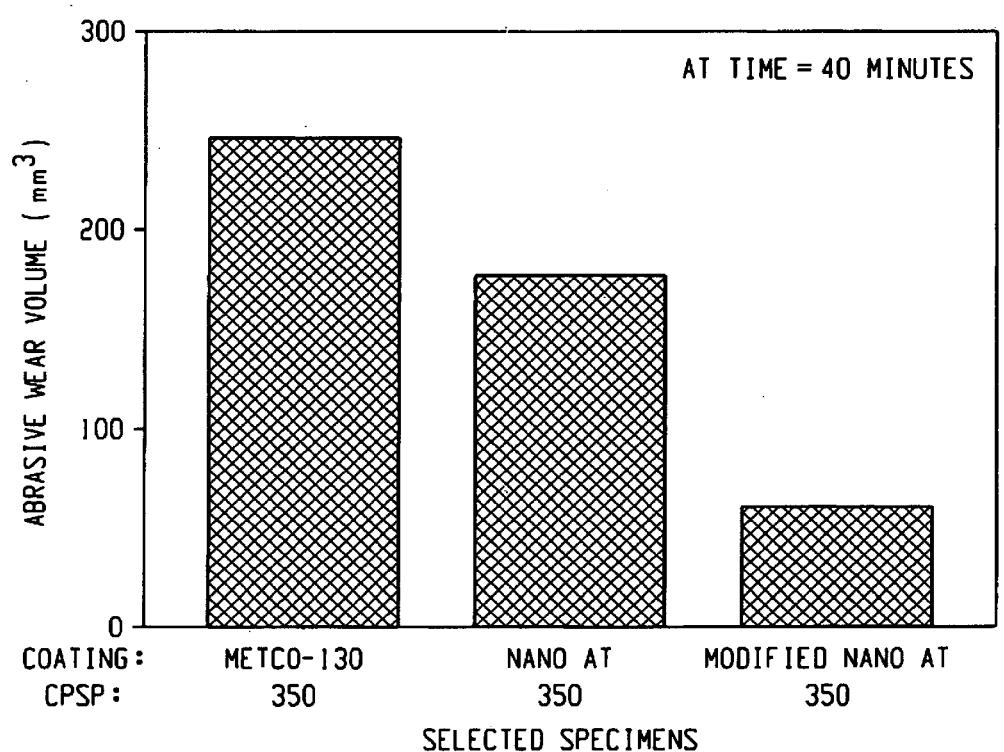
FIG. 24 is a graph depicting abrasive wear volume of plasma sprayed alumina-titania coatings at selected CPSP.
Figure 25:
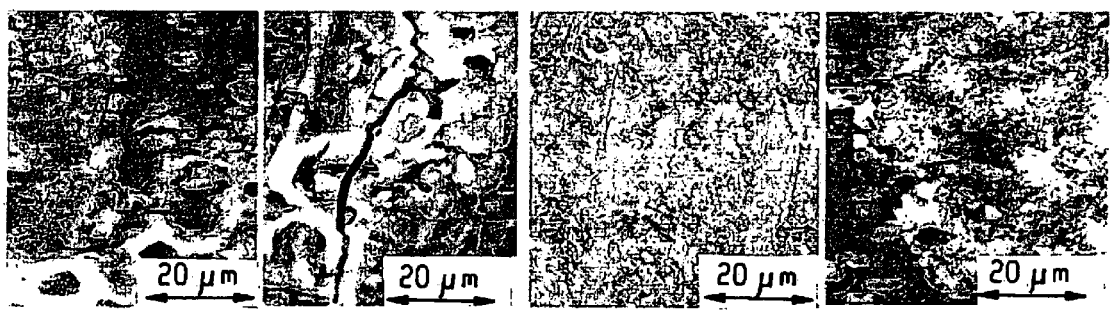
FIG. 25 shows the surface morphology of (a, c) Metco-130 and (b, d) reconstituted nanostructured $Al_2O_3$-13 wt % $TiO_2$ coatings after the (a, b) abrasive wear and (c, d) scratch test.

Improvements in the abrasive wear resistance were also observed for nanostructured coatings deposited at selected CPSP's as shown in FIG. 24. Such findings are consistent with previous results where the corresponding wear mechanisms were proposed. Improvement in sliding wear resistance was also observed for nanostructured coatings; consistent with previous results. The improvement in abrasive wear is visually confirmed from the wear and scratched surfaces presented in FIG. 25, where a large scale cracking/ material removal occurs for Metco-130 and reduced material removal without cracking occurs for the reconstituted nanostructured coatings.

Figure 26:
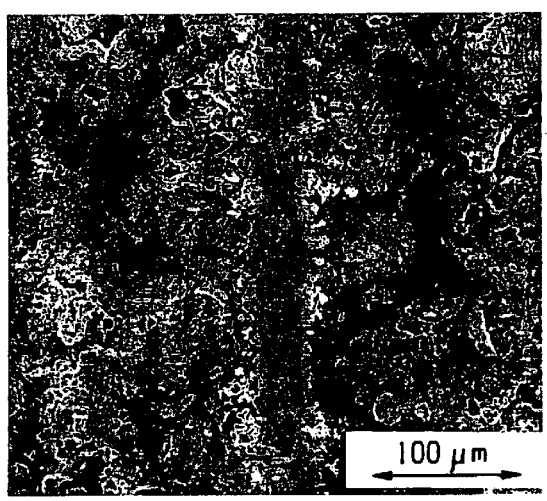
FIGS. 26a and 26b are secondary electron images of wear tracks from "scratch-tests" for (a) nanostructured and (b) Metco-130 coating.
Figure 26:
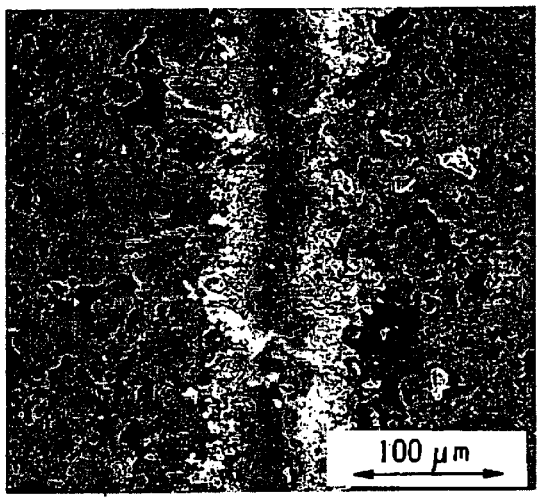

Typical results from a "scratch-test" using a diamond indentor are presented in FIG. 26. For nanostructured coatings, the wear track has a small width and a minimum extrusion of materials. For Metco-130 coatings, the wear track is wider with more debris. These observations from "scratch-tests" support the improved abrasive and sliding wear resistance realized by nanostructured alumina-titania coatings deposited by plasma spray process at appropriate CPSP.

Figure 16:
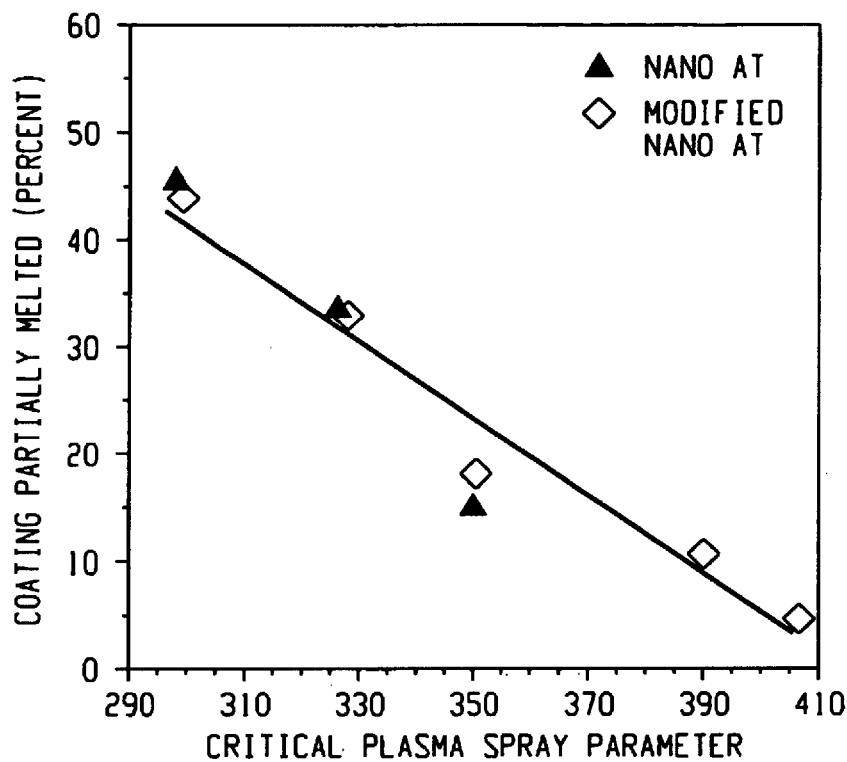
FIG. 16 is a graph depicting the percentage of coating that is partially melted, determined by quantitative image analysis as a function of CPSP.
Figure 27:
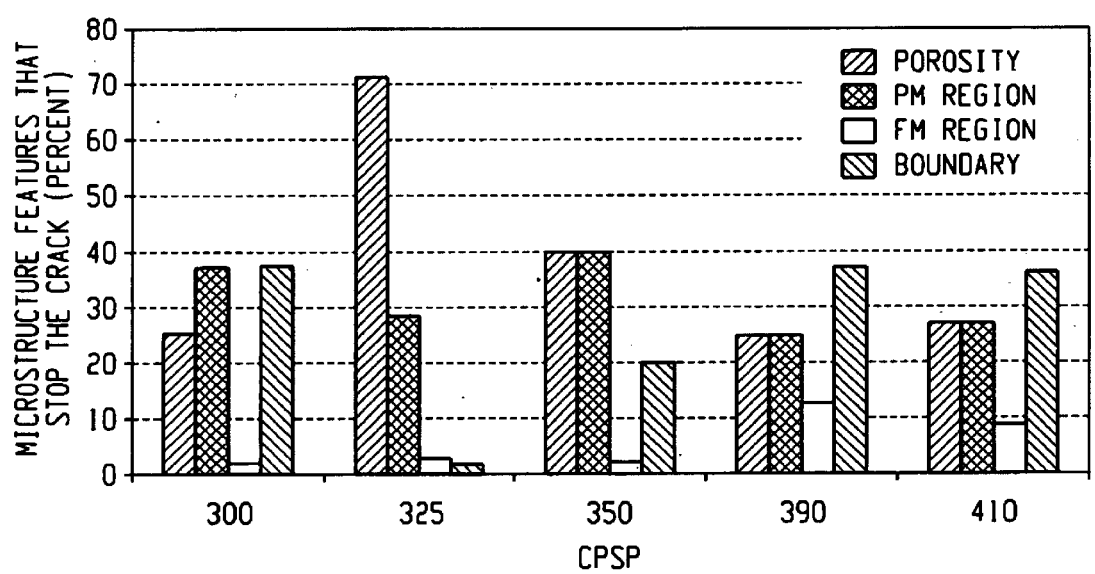
FIG. 27 shows percentage of microstructure features in the nano alumina-titania coatings that stop the crack as a function of CPSP.

In order to provide a semi-quantitative determination of the effect of microstructure on crack growth resistance, the microstructural changes with CPSP were determined. As shown in FIG. 16, the volume fraction of the partially melted regions decreases with CPSP. Based on the detailed examination of cracks around at least 10 hardness indentations in each nanocoating, the relative contributions made by various microstructural features, interface boundaries, porosity, partially melted and fully melted regions, to crack growth resistance was assessed. FIG. 27 shows the results. By comparing FIGS. 16 and 27, it can be seen that at CPSP=410 where 90% of the microstructure is fully melted splats, the splats account for only 10% of the crack arrests. By contrast, 64% of the crack arrests in the CPSP=410 specimens are associated with crack arrests in the partially melted regions and by crack deflection at the boundary between partially and fully melted areas. Porosity in the microstructure plays a larger role as the CPSP is reduced. However, for CPSP's less than 350, the porosity level is high (about 10%) because of a high volume fraction of partially melted particles which lowers the overall crack growth resistance of these microstructures.

Various properties, including porosity, hardness, indentation crack growth resistance, bend-test, cup-test, adhesive strength, abrasive, and sliding wear resistance were evaluated for plasma sprayed alumina-titania coatings. The results, presented in FIGS. 17 through 26, indicate that improvements in indentation crack growth resistance, resistance to cracking and spallation, adhesion strength, resistance to abrasive and sliding wear were observed for the nanostructured alumina-titania coatings, despite higher porosity and lower hardness. In addition, improvements in some properties were found at intermediate values of CPSP, for which partial melting of reconstituted agglomerates introduce sub-micron $\alpha$-$Al_2O_3$. Further improvement in 87 wt % $Al_2O_3$-13 wt %$tiO_2$ coatings modified with $CeO_2$ and $ZrO_2$ additives may be associated with chemistry as well as further reduction in grain size. $CeO_2$ and $ZrO_2$ can act as nucleation sites and/or as grain growth inhibitors.

Figure 21:
FIGS. 21a–c are photographs of representative results from bend tests: (a) complete failure, (b) partial failure and (c) pass.
Figure 21:
Figure 21:
Figure 22:
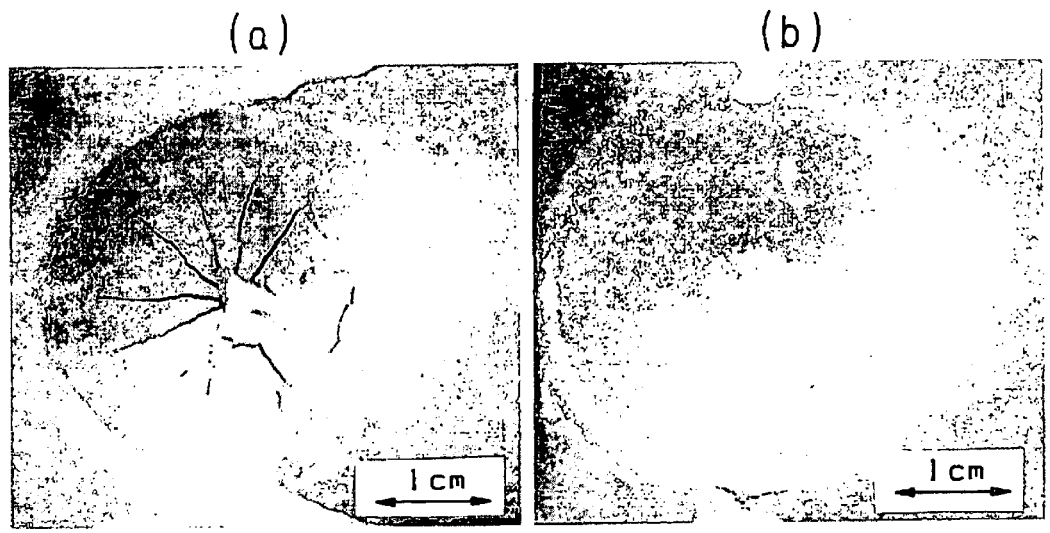
FIGS. 22a and b are photographs showing typical results observed for plasma sprayed (a) Metco-130 coatings and (b) nanostructured alumina-titania coatings after the cup tests.

Nanostructured coatings outperformed conventional coatings in cup and bend tests and the test results improved as the amount of partially melted structure increased and CPSP decreased as indicated in FIGS. 21 and 22 and as reported in Table 7. Improvement in cup and bend test would be expected if the cracking perpendicular to the coatings/substrate interface occurs more easily than the spallation-debonding. Thus, the improved adhesive strength of nano-derived coatings would be expected to give improved cup and bend test results. FIG. 23 shows that the indentation crack growth resistance peaks at spray parameters of CPSP between 350 and 380. These results can be associated with a microstructural mixture having both FM and PM regions. It is further worth noting that the indentation cracking was almost exclusively parallel to the metal ceramic interface and many of the cracks are more than 10 indentation diagonals long. It is likely that cracks extending so far from the indentation are influenced not only by the splat boundary weakness but also by residual stresses within the coating.

In considering the relation between the improved mechanical properties and the observed structure, all the coatings deposited from the reconstituted nanostructured agglomerates had improved adhesive strength. The improvement in adhesive strength occurred regardless of the spray conditions or the fraction of the structure that was partially melted or even the presence of modifying elements as indicated in FIG. 23. During the adhesive strength test of nano-derived coatings, failures almost always occurred within the coating near the coating/substrate interface; thus the adhesive strength for the nano-derived coatings may be governed by the tensile strength of the nanostructured coatings. On the other hand, the Metco 130 coatings were the only coatings to show a significant fraction of failures at the ceramic to metal interface.

Nanostructured alumina-titania coatings were produced by plasma spray of reconstituted nanostructured powders, using optimized processes, defined by a critical plasma spray parameter. Superior mechanical properties were achieved including indentation crack resistance, adhesion strength, spallation resistance against bend- and cup-test, abrasive wear resistance, sliding wear resistance. The superior properties are associated with coatings that have a retained nanostructure, especially with partial melting of the nanostructured powders.

While preferred embodiments have been shown and described, various modifications and substitutions may be made thereto without departing from the spirit and scope of the invention. Accordingly, it is to be understood that the present invention has been described by way of illustration and not limitation. All cited patents and other documents are incorporated herein by reference.

What is claimed is:

1. A coating comprising a duplex microstructured material comprising substantially nanostructured state contiguous with substantially microstructured state, wherein the nanostructured state and the microstructured state are contiguous over at least a substantial portion of an interface between the two states, wherein a volume fraction of the substantially microstructured state within the duplex microstructured material is less than or equal to about 45 percent, and wherein the duplex microstructured material is porous.

2. The coating of claim 1, comprising alumina and titania.

3. The coating of claim 1, comprising chromia and titania.

4. The coating of claim 1, comprising at least one metal oxide having at least one phase.

5. The coating of claim 1, wherein the coating has a thickness of about 200 to about 800 micrometers.

6. A coating comprising a duplex microstructured material comprising substantially nanostructured state contiguous with substantially microstructured state, wherein the nanostructured state and the microstructured state are contiguous over at least a substantial portion of an interface between the two states, wherein a volume fraction of the substantially microstructured state within the duplex microstructured material is less than or equal to about 45 percent.

7. The coating of claim 6, comprising alumina and titania.

8. The coating of claim 6, comprising chromia and titania.

9. The coating of claim 6, comprising at least one metal oxide having at least one phase.

10. The coating of claim 6, wherein the coating has a thickness of about 200 to about 800 micrometers.

11. The coating of claim 6, wherein the duplex microstructured material is formed by a thermal spray process.

12. An article comprising a duplex microstructured material comprising substantially nanostructured state contiguous with substantially microstructured state, wherein the nanostructured state, which comprises a fully-melted splat, and the microstructured state, which comprises a partially-melted region, are contiguous over at least a substantial portion of an interface between the two states, wherein the article is formed by thermal spraying, and wherein a volume fraction of the substantially microstructured state within the duplex microstructured material is less than or equal to about 45 percent.

13. The article of claim 12, wherein a crack propagating through a splat boundary is arrested after encountering the partially melted region of the microstructured state.

14. The article of claim 12, wherein a crack propagating through a splat boundary is deflected after encountering the partially melted region of the microstructured state.

15. The article of claim 12, comprising alumina and titania.

16. The article of claim 12, comprising chromia and titania.

17. The article of claim 12, comprising at least one metal oxide having at least one phase.

* * * * *